US011473709B2

United States Patent
Van Dam et al.

(10) Patent No.: US 11,473,709 B2
(45) Date of Patent: Oct. 18, 2022

(54) METHOD FOR SELECTIVELY COUPLING OR UNCOUPLING A COUPLING, AND A COUPLING THEREFOR

(71) Applicant: Holmatro B.V., Raamsdonksveer (NL)

(72) Inventors: Alexander Simon Johannes Van Dam, Rossum (NL); Marinus Petrus Gerardus Schippers, Hooge Zwaluwe (NL); René Wilhelmus Johannes Van Eindhoven, Oisterwijk (NL)

(73) Assignee: HOLMATRO B.V., Raamsdonksveer (NL)

( * ) Notice: Subject to any disclaimer, the term of this patent is extended or adjusted under 35 U.S.C. 154(b) by 0 days.

(21) Appl. No.: 17/637,275

(22) PCT Filed: Aug. 12, 2020

(86) PCT No.: PCT/NL2020/050508
§ 371 (c)(1),
(2) Date: Feb. 22, 2022

(87) PCT Pub. No.: WO2021/040515
PCT Pub. Date: Mar. 4, 2021

(65) Prior Publication Data
US 2022/0268386 A1   Aug. 25, 2022

(30) Foreign Application Priority Data

Aug. 23, 2019   (NL) ........................................ 2023701
Feb. 24, 2020   (NL) ........................................ 2024977

(51) Int. Cl.
*F16L 37/32*   (2006.01)
*F16L 37/62*   (2006.01)
(Continued)

(52) U.S. Cl.
CPC ............ *F16L 37/62* (2013.01); *F15B 15/149* (2013.01); *F15B 20/00* (2013.01); *F16L 37/33* (2013.01);
(Continued)

(58) Field of Classification Search
CPC . F16L 37/62; F16L 37/33; F16L 37/35; F16L 37/36; F15B 15/149; F15B 20/00; F15B 2215/00
(Continued)

(56) References Cited

U.S. PATENT DOCUMENTS 3,674,051 A * 7/1972 Stratman ................. F16L 37/33
137/614.04
3,710,823 A * 1/1973 Vik .................... F16K 31/52425
285/124.1
(Continued)

FOREIGN PATENT DOCUMENTS

DE   102013207298 A1   10/2014
FR   2708329 A1   2/1995

OTHER PUBLICATIONS

International Search Report and Written Opinion for the International Patent Application No. PCT/NL2020/050508, dated Dec. 11, 2020, 10 pages.

*Primary Examiner* — Minh Q Le
(74) *Attorney, Agent, or Firm* — KDB Firm PLLC

(57) ABSTRACT

A method for selectively coupling or uncoupling a coupling with a release, arranged between the supply conduit and a cylinder, on the basis of pressure in a supply conduit. The method includes providing an operating pressure prevailing in the supply conduit in order to provide hydraulic liquid to the cylinder on the basis thereof and providing an uncoupling pressure prevailing in the supply conduit for the purpose of activating shut-off valves in the supply conduit and on the cylinder and activating a release which uncouples
(Continued)

the coupling. A coupling for respectively coupling and uncoupling a supply conduit which is connected to the coupling to/from a cylinder, as well as to an assembly including a pump, a cylinder, a supply conduit between the pump and the cylinder, and such a coupling.

15 Claims, 29 Drawing Sheets

(51) Int. Cl.
*F15B 15/14* (2006.01)
*F16L 37/35* (2006.01)
*F16L 37/33* (2006.01)
*F15B 20/00* (2006.01)
*F16L 37/36* (2006.01)

(52) U.S. Cl.
CPC ........... *F16L 37/35* (2013.01); *F15B 2215/00* (2013.01); *F16L 37/36* (2013.01)

(58) Field of Classification Search
USPC ................................. 137/15.09, 68.14, 68.11
See application file for complete search history.

(56) References Cited

U.S. PATENT DOCUMENTS

| | | | | |
|---|---|---|---|---|
| 3,730,221 A * | 5/1973 | Vik | ........................ | F16L 37/33 137/614.04 |
| 4,865,077 A * | 9/1989 | Batchen | .................. | F16L 37/33 137/614.04 |
| 4,921,000 A * | 5/1990 | King | ....................... | B63B 27/24 137/68.14 |
| 5,255,714 A * | 10/1993 | Mullins | .................... | F16L 37/33 285/91 |
| 5,285,807 A * | 2/1994 | Nitzberg | .................. | B67D 7/04 137/614.04 |
| 5,469,887 A * | 11/1995 | Smith, III | ............... | F16L 37/35 137/614.04 |
| 5,911,403 A * | 6/1999 | deCler | ................. | B67D 7/0294 251/149.6 |
| 6,095,191 A * | 8/2000 | Smith, III | ............... | F16L 37/62 137/614.04 |
| 6,302,148 B1 * | 10/2001 | Imai | ........................ | F16L 37/35 137/614.04 |
| 6,439,305 B1 * | 8/2002 | Bakke | ..................... | E21B 17/06 166/242.6 |
| 6,502,600 B2 | 1/2003 | Ennemark et al. | | |
| 9,617,819 B2 * | 4/2017 | Older | ........................ | F16L 1/26 |
| 2004/0244848 A1 * | 12/2004 | Maldavs | ................. | F16L 37/35 137/614.04 |
| 2007/0176414 A1 * | 8/2007 | McBee | ...................... | F16L 37/62 285/101 |
| 2011/0240154 A1 * | 10/2011 | Renshaw | .............. | E21B 33/038 137/596 |
| 2012/0247318 A1 * | 10/2012 | Jubert | ..................... | F15B 15/20 91/394 |
| 2012/0318519 A1 * | 12/2012 | Webb | ...................... | F16L 37/33 137/511 |
| 2015/0167882 A1 * | 6/2015 | Von Keitz | ............... | F16L 37/08 137/15.09 |
| 2016/0305591 A1 * | 10/2016 | Chen | ....................... | F16L 37/35 |
| 2017/0219147 A1 * | 8/2017 | Foley | ...................... | F16L 35/00 |
| 2017/0328164 A1 * | 11/2017 | Partridge | ................ | F16L 37/62 |
| 2018/0142824 A1 * | 5/2018 | Gennasio | ................ | F16L 37/32 |
| 2020/0217040 A1 * | 7/2020 | Hill | ........................ | E02F 3/3654 |

* cited by examiner

METHOD FOR SELECTIVELY COUPLING OR UNCOUPLING A COUPLING, AND A COUPLING THEREFOR

"This application is a national stage filing under 35 U.S.C. 371 of pending International Application No. PCT/NL2020/050508, filed Aug. 12, 2020, which claims priority to Netherlands Patent Application No. 2023701, filed Aug. 23, 2019, and also claims priority to Netherlands Patent Application No. 2024977, filed Feb. 24, 2020, the entirety of which applications are incorporated by reference herein."

The invention relates to a method for selectively coupling or uncoupling a coupling, and more particularly to a method for selectively coupling or uncoupling on the basis of pressure in a supply conduit a coupling with a release, which is arranged between the supply conduit and a cylinder.

The invention further relates to a coupling for respectively coupling and uncoupling a supply conduit which is connected to the coupling to/from a cylinder, as well as to an assembly comprising such a coupling, and to a control for such an assembly.

Many constructions, which are placed offshore, consist of a foundation and an upper part. Sometimes a transition piece is also present therebetween. It is often necessary to form a temporary connection between parts of the construction when they are being placed. The use of hydraulic cylinders for this application is generally accepted. After the definitive connection has been made, the cylinders are relieved again so that the definitive connection transmits the forces between the parts of the construction.

When prior art couplings are uncoupled, it is common for a limited amount of hydraulic liquid to run from the cylinder into the sea after the coupling has been uncoupled from a hydraulic cylinder. The cylinder generally remains behind, and only the coupling and the supply conduit are lifted from the sea. Operating of the uncoupling generally takes place via a hydraulic conduit configured for this purpose, whereby in a conventional system a second hydraulic conduit is also provided for the purpose of operating the coupling, this in addition to a hydraulic supply conduit for feeding a hydraulic medium to the cylinder under pressure.

It is an object of the present invention to provide a method and coupling, wherein the stated drawbacks do not occur, or at least do so to lesser extent.

The stated object is achieved according to the invention with a method for selectively coupling or uncoupling a coupling with a release, arranged between the supply conduit and a cylinder, on the basis of pressure in a supply conduit, comprising the steps of:
  providing an operating pressure prevailing in the supply conduit in order to provide hydraulic liquid to the cylinder on the basis thereof; and
  providing an uncoupling pressure prevailing in the supply conduit for the purpose of:
    activating shut-off valves in the supply conduit and on the cylinder; and
    activating a release which uncouples the coupling.

Because according to the invention a pressure prevailing in the supply conduit can be used to allow the coupling to switch between different positions, it is possible, even with a single hydraulic conduit, to bring about an uncoupling, wherein hydraulic liquid is moreover prevented from leaking to the surrounding area. This also creates the option of evacuating hydraulic liquid from a cylinder which remains behind from the cylinder to the supply hose prior to uncoupling of the supply hose and the cylinder.

The invention further relates to a coupling for respectively coupling and uncoupling a supply conduit which is connected to the coupling to/from a cylinder, comprising:
  a hydraulically controllable release; and
  a hydraulic control which is connected at least to the release and is configured to:
    provide hydraulic liquid to the cylinder when an operating pressure prevails in the supply conduit; and
    activate the release and uncouple the coupling when an uncoupling pressure prevails in the supply conduit.

Particularly advantageous preferred embodiments form the subject of the dependent claims.

Preferred embodiments of the present invention are further elucidated in the following description with reference to the drawing, in which.

In the placing of foundations for wind turbines the foundation is referred to as monopile or MP. The transition part between the foundation and the mast is referred to as transition piece or TP. When the transition piece is placed on the monopile, there is a function for hydraulic cylinders at two locations in the construction (FIGS. 1A and 1B).

Figures 1A, 1B:
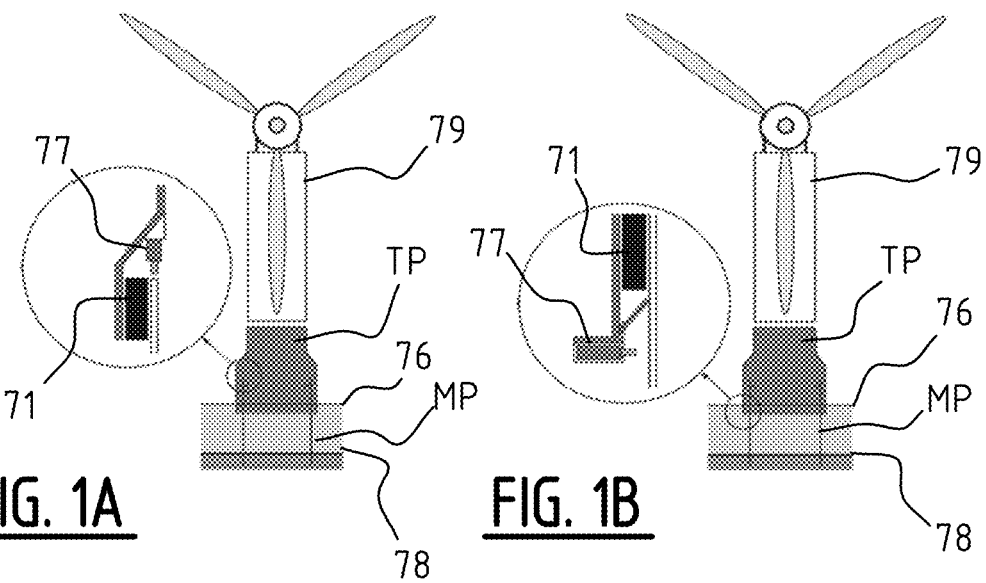
FIG. 1A is a schematic representation of the hydraulic adjustment of a transition piece (TP) to a levelled/vertical orientation as according to the invention.
FIG. 1B is a schematic representation of the hydraulic fixing of the transition piece relative to a monopile as according to the invention.

FIG. 1A shows the hydraulic adjustment of the transition piece TP to a levelled/vertical orientation by means of using cylinders 77. These cylinders 77 are generally mounted in the TP and, from there, also operated by an operator by means of a hydraulic pump. When the orientation of the TP has been set, the TP is temporarily fixed relative to the MP. The monopile MP is in the seabed 78, and the transition piece TP carries a turbine 79.

FIG. 1B shows the hydraulic fixing of the TP relative to the MP by means of using hydraulic cylinders 77. This ensures that the parts do not move relative to each other during arranging of the definitive connection. In this case this is grout 71, a type of cement. After grout 71 has cured, cylinders 77 must be relieved in order to ensure that the force that must be transmitted between the two parts of the construction is transmitted purely via the grouted connection.

In the above the challenge lies in the fact that fixation cylinders 77 are mounted under the water surface 76. Because of this, the cylinders 77 have to be remote-controlled. An additional problem is that all hydraulic conduits to fixation cylinders 77 must be removed after the installation process, and that no hydraulic liquid, or at least as little hydraulic liquid as possible, should be released therein.

In the present prior art there are roughly two ways of solving the described problem.

Figure 2A:
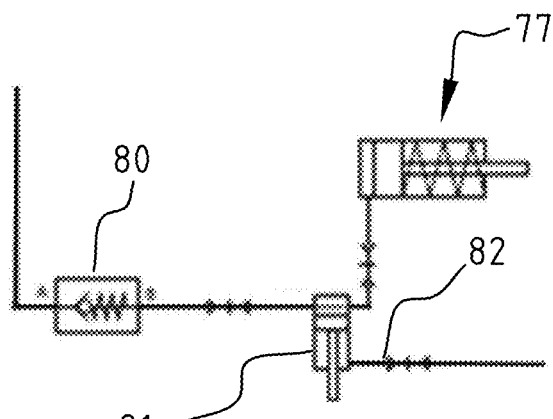
FIGS. 2A and 2B are representations of a prior art embodiment.
Figure 2B:
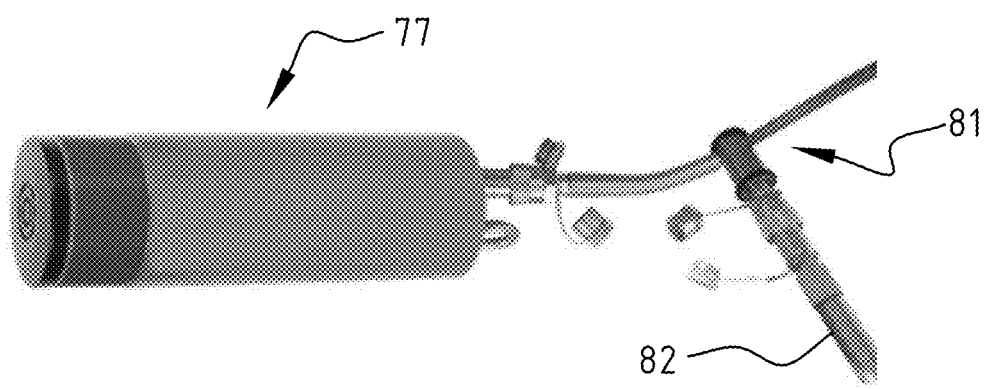

The first solution can be seen in FIGS. 2A and 2B. A non-return valve 80 is placed in the supply conduit to cylinder 77. This ensures that oil can get into but not out of cylinder 77. This ensures that cylinder 77 is load-bearing. A hose cutter 81 is mounted on the short length of hose between cylinder 77 and the non-return valve. This cutter has its own supply conduit 82. When the grout 71 in the foundation has cured sufficiently, hose cutter 81 is activated. This causes the hose between cylinder 77 and non-return valve 80 to be cut. Cylinder 77 will return by means of a spring mounted in cylinder 77. The medium present in cylinder 77 runs into the sea, which is undesirable, but perhaps acceptable under some circumstances, since it is only a limited amount of medium. Both the hose running to cylinder 77 and the hose with the hose cutter 81 can then be pulled upward and above water surface 76. Cylinder 77 remains behind in the construction but can no longer bear load.

A further prior art development (not shown) is a valve which is mounted on the cylinder. The valve is provided with two supply conduits. The one is used to operate the cylinder. The cylinder is brought to pressure and, after curing of the grout, is relieved of pressure again. The cylinder will return by means of a spring mounted in the cylinder. The medium present in the cylinder is collected on top of the TP, in a tank. The second hose is then used to transmit a control pressure to the uncoupling mechanism. This causes the valve to be uncoupled from the cylinder after the grouting process. The valve is then pulled upward to a position above the water surface by the two hoses.

The invention relates to a method for selectively coupling or uncoupling a coupling with a release, arranged between the supply conduit and a cylinder, on the basis of pressure in a supply conduit, comprising the steps of:

providing an operating pressure prevailing in the supply conduit in order to provide hydraulic liquid to the cylinder on the basis thereof; and providing an uncoupling pressure prevailing in the supply conduit for the purpose of:

activating shut-off valves in the supply conduit and on the cylinder; and activating a release which uncouples the coupling.

In order to be able to perform this method a coupling is according to the invention further provided for the purpose of respectively coupling and uncoupling a supply conduit which is connected to the coupling to/from a cylinder, comprising:

a hydraulically controllable release; and a hydraulic control which is connected at least to the release and is configured to:

provide hydraulic liquid to the cylinder when an operating pressure prevails in the supply conduit; and
activate the release and uncoupling the coupling when an uncoupling pressure prevails in the supply conduit.

The embodiment described below comprises at least one spring return pressure cylinder 1, at least one hydraulic coupling 2 consisting of a female coupling half 6 and a male coupling half 7, an release mechanism 5 and only one liquid supply conduit 3 in which the liquid can be supplied and brought to pressure remotely, by a pump 4.

According to the present invention, at least two of the following three functions are activated sequentially in at least three pressure steps, including for instance:
 a first function, also referred to hereafter as "operative function"; wherein the cylinder is extended and brought to the required operating pressure (500 bar) in order to fulfil the function for which the cylinder is intended;
 a second function, also referred to hereafter as "evacuating function"; wherein the cylinder is relieved and is retracted at least partially; and
 a third function, also referred to hereafter as "uncoupling function"; wherein the release mechanism is actuated and the coupling halves are uncoupled.

The release mechanism is an embodiment of a controllable coupling. In a first preferred embodiment (FIGS. 3-5) cylinder assembly 1a comprises internally a retracting pin 8a (shown in FIGS. 4 and 5) which is pivotally connected to a seesaw member 9. Plunger 12a is urged into a retracted position by a draw spring 13a. Prior to installation plunger 12a must be partially extended, such that seesaw member 9 is given space to pivot around a pivot point 11 and retracting pin 8a can take up an extended position (FIG. 4). In this extended position already connected coupling halves 6a and 7a are fixed by retracting pin 8a. The force necessary to extend plunger 12a such that retracting pin 8a can take up the extended position is realized by means of applying an operating pressure of 5 bar in supply conduit 3a by means of the pump 4a shown in FIG. 3. Coupling halves 6a and 7a each have a non-return valve 32a and 33a which, when the two coupling halves 6a, 7a are coupled, press each other open. When coupling halves 6a, 7a are however uncoupled, the non-return valves fall shut and thus prevent oil leakage.

After installation, the above-described operative function can be carried out, wherein an operating pressure of 500 bar is applied by pump 4a in supply conduit 3a and therefore in cylinder chamber 15a. Cylinder assembly 1a will thus fulfil the function for which it is intended in normal operation, i.e. applying a clamping force.

Figure 3:
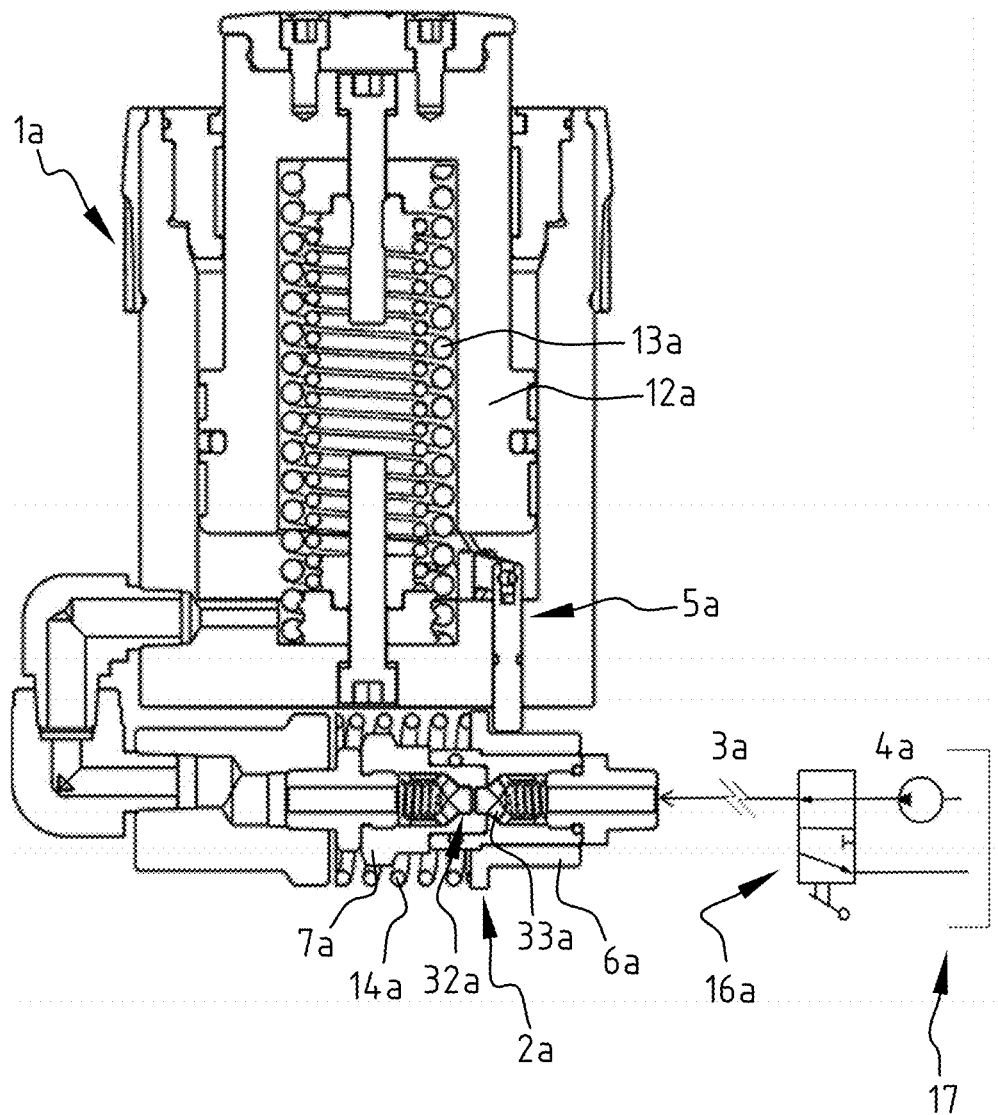
FIGS. 3-5 are cross-sectional views of a coupling according to a first preferred embodiment of the invention in various situations.
Figure 4:
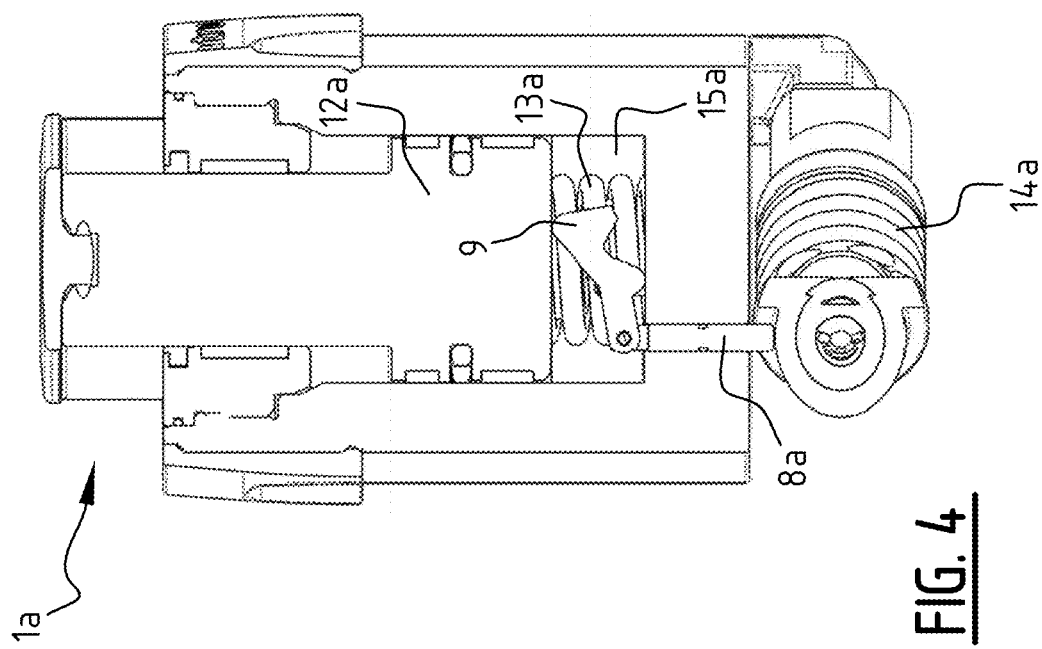
Figure 6:
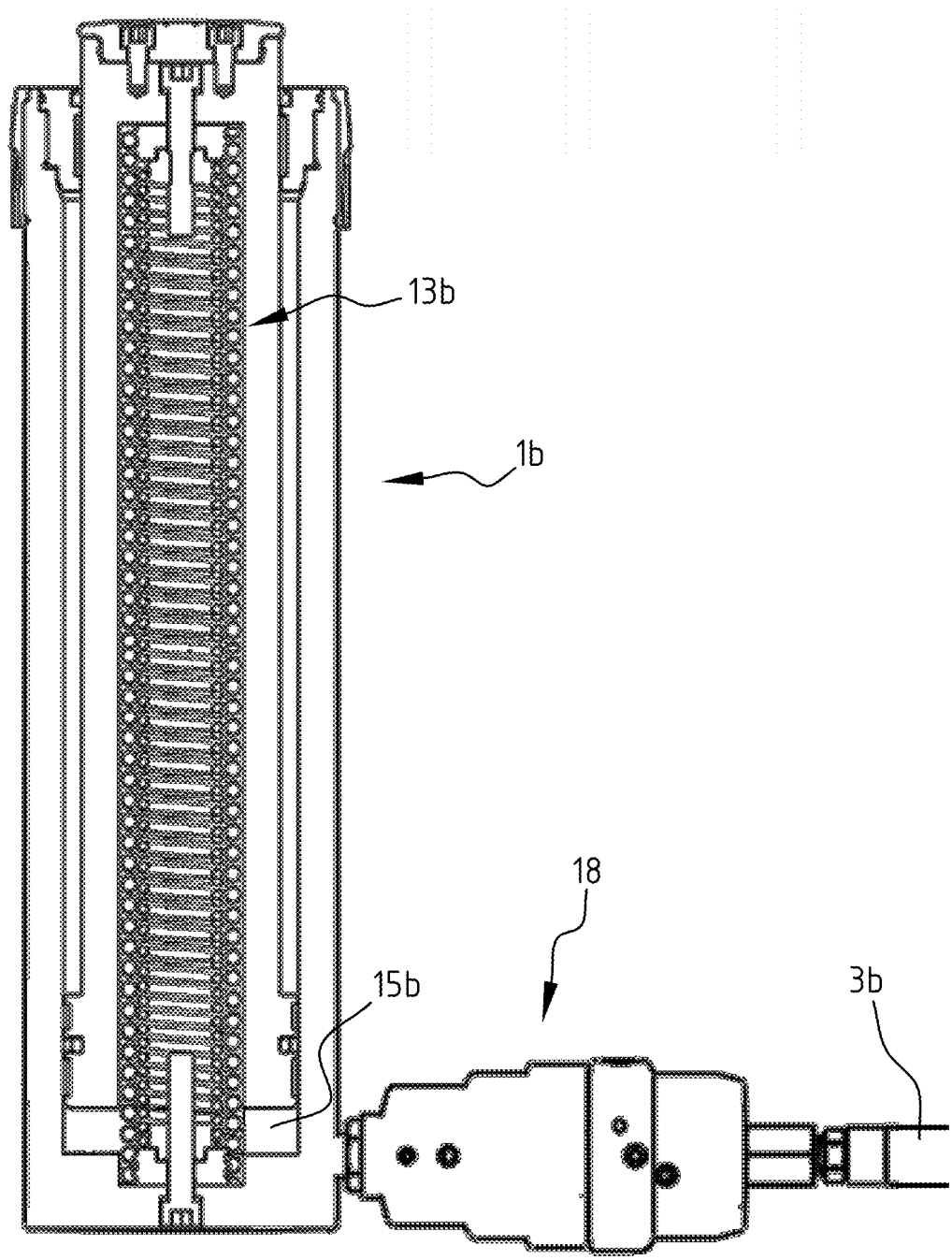
FIG. 6 is a schematic cross-section of a cylinder which is coupled with a coupling according to a second preferred embodiment to a supply conduit.
Figure 7:
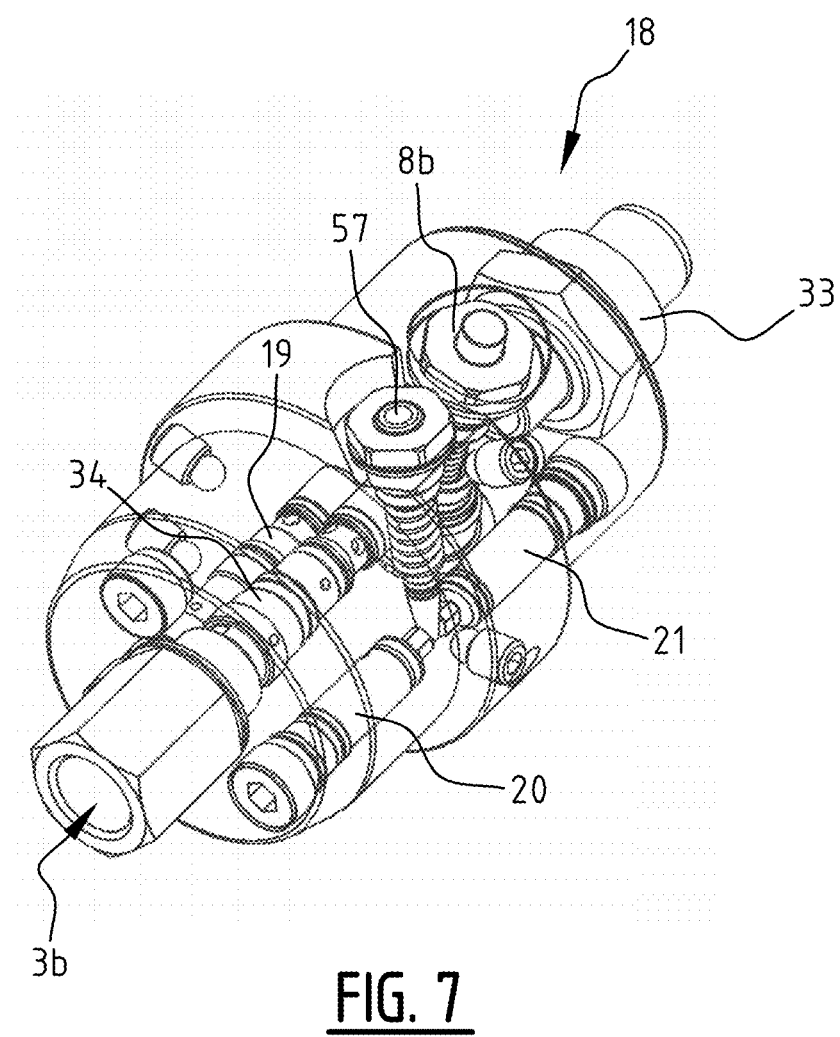
FIG. 7 is a perspective semi-transparent view of the coupling according to the second preferred embodiment.
Figure 8:
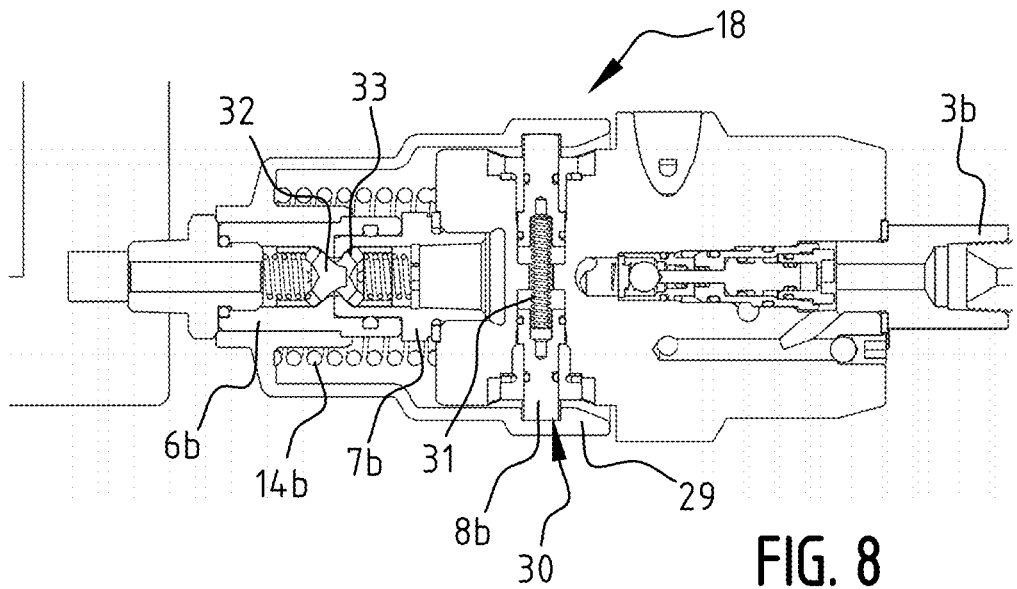
FIG. 8 is a cross-sectional view of the coupling shown in FIGS. 6 and 7.
Figure 9:
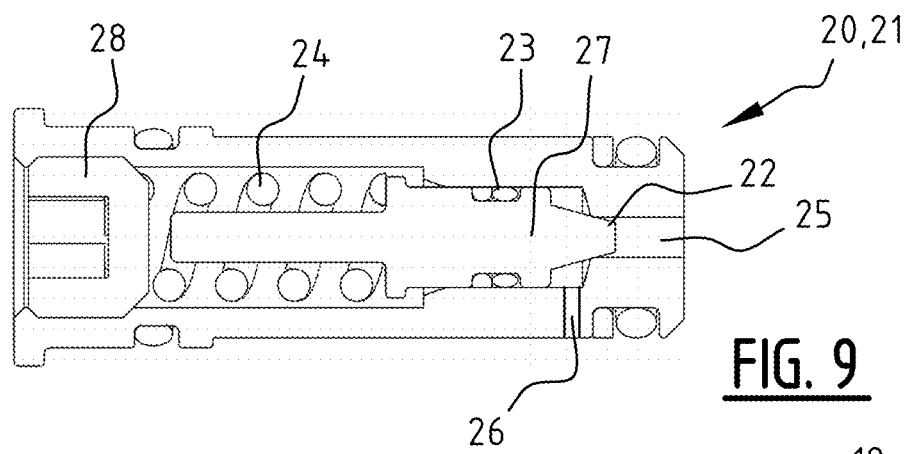
FIG. 9 is a cross-sectional view of a first and second sequence valve of the coupling shown in FIGS. 6 and 7.
Figure 10:
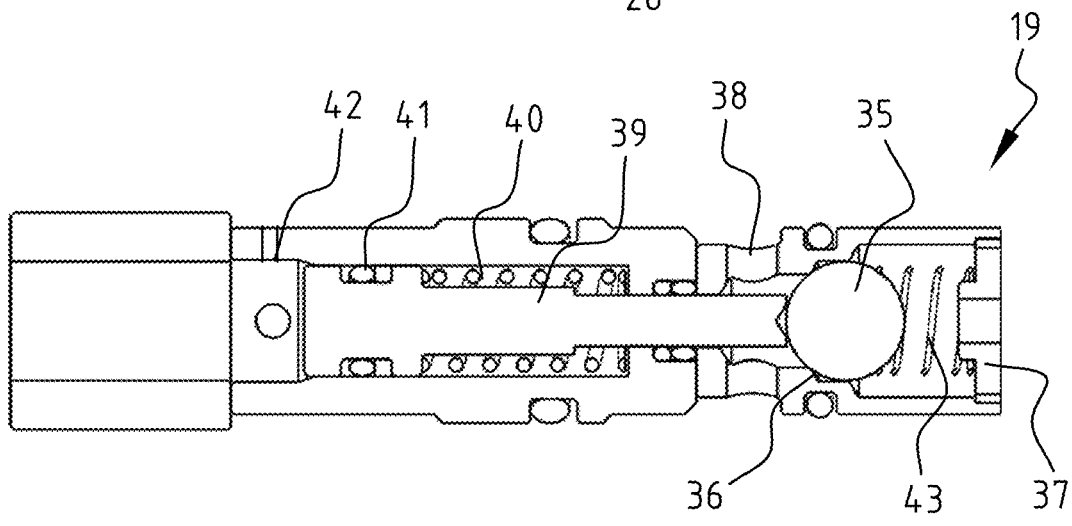
FIG. 10 is a cross-sectional view of a first control valve of the coupling shown in FIGS. 6 and 7.
Figure 11:
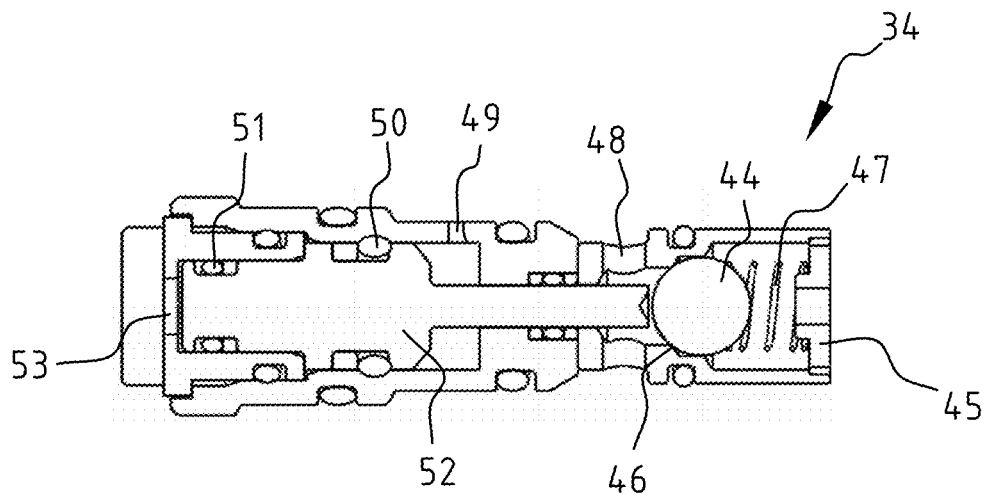
FIG. 11 is a cross-sectional view of a second control valve of the coupling shown in FIGS. 6 and 7.
Figure 12:
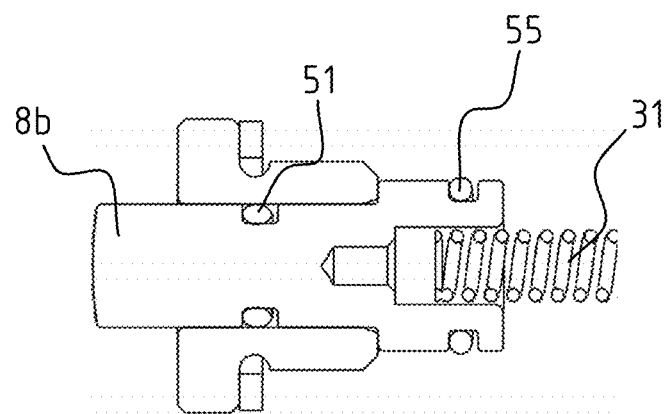
FIG. 12 is a cross-sectional view of a retracting pin of the coupling shown in FIGS. 6 and 7.

The above mentioned evacuating function is activated by opening the valve 16a, which is shown in FIG. 3 and is positioned at the position of pump 4a, and reducing the operating pressure from 500 bar to 5 bar. Plunger 12a will retract using draw spring 13a, and the hydraulic liquid from cylinder chamber 15a will flow via coupling halves 6a and 7a, supply conduit 3a and valve 16a back into reservoir 17a. Cylinder 1a is hereby retracted at least partially.

Figure 5:
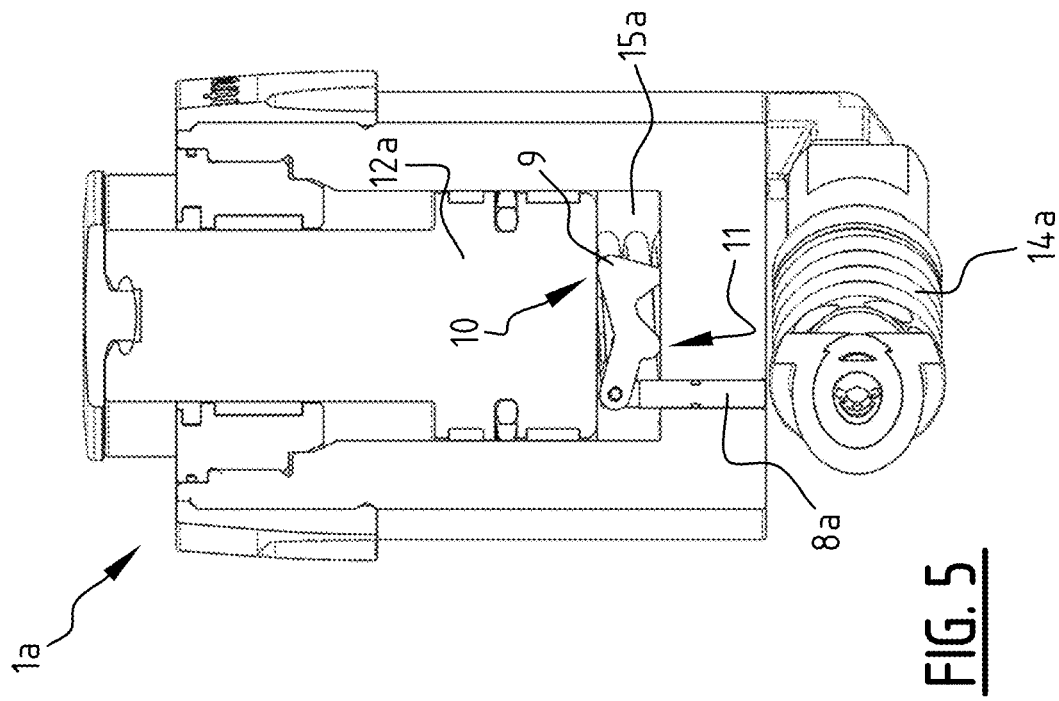

The above mentioned uncoupling function is then activated. When the operating pressure becomes lower than 5 bar, draw spring 13a will retract plunger 12a further still. Plunger 12a will hereby make contact at the position of pivot point 10 with seesaw element 9 which, when plunger 12a is retracted further, pivots around pivot point 11 and thus urges retracting pin 8a into a retracted position (FIG. 5). Coupling halves 6a and 7a are hereby no longer mechanically fixed. Compression spring 14a will then urge the two coupling halves 6a and 7a apart. The non-return valves in the two coupling halves 6a and 7a close, whereby the remaining liquid from cylinder chamber 15a or supply conduit 3a cannot leak out. This prevents the release from shooting into this state (with all the consequences this entails), on the one hand during pressureless mounting of the cylinder on the TP or on the other hand if the pressure is raised to 5 bar (and then higher), up to the operating pressure, by means of a temporary mechanical locking which must be manually removed after installation.

In a second preferred embodiment (FIGS. 6-18) a cylinder assembly 1b is connected to a female coupling half 6b and a valve assembly 18 is connected to a male coupling half 7b and to a supply conduit 3b. Positioned between the two coupling halves 6b and 7b is a compression spring 14b. During installation of the cylinder assembly 1b relative to the valve assembly 18 a compression spring 14b is compressed and the two coupling halves 6b and 7b are mechanically fixed by at least one retracting pin 8b which is forced into a groove 30 of a sleeve 29 by a compression spring 31. Coupling halves 6b and 7b each comprise a non-return valve 32, 33 which, when the two coupling halves 6b, 7b are coupled, press each other open. When coupling halves 6b, 7b are however uncoupled, non-return valves 32, 33 fall shut and thus prevent oil leakage.

Sequence valves 20 and 21 (FIG. 9) both comprise an adjusting screw 28, a compression spring 24, a cone 27, a seat 22, a radial seal 23, a feed opening 25 and a discharge opening 26, wherein the diameter of seat 22 is substantially smaller than the diameter of radial seal 23. Cone 27 is pressed with a determined force into seat 22 by adjusting compression spring 24 by means of tightening adjusting screw 28. When a pressurized liquid is applied to feed opening 25, a force is created on cone 27 in the direction of compression spring 24. When the pressure rises to a predetermined or pre-set threshold value, which differs for the sequence valves 20 and 21, the cone will be pressed out of seat 22. The pressure value necessary for this purpose is adjustable by pressing compression spring 24 against cone 27 with more or less force by means of tightening adjusting screw 28. When cone 27 is pressed out of seat 22, the pressurized liquid will press against radial seal 23. Due to a difference in diameter between seat 22 and radial seal 23, cone 27 will then fall back onto seat 22 again at a substantially lower pressure. The pressure drop between feed opening 25 and discharge opening 26 is hereby minimized.

Compression spring 24 of first sequence valve 20 is set such that cone 27 of first sequence valve 20 opens at an operating pressure of 600 bar and closes at an operating pressure of 90 bar.

Compression spring 24 of second sequence valve 21 is set such that cone 27 of second sequence valve 21 opens at an operating pressure of 700 bar and closes at an operating pressure of 100 bar.

A first control valve 19 (FIG. 10) comprises a ball 35, a seat 36, a control plunger 39, a first compression spring 40, a second compression spring 43, a radial seal 41, a first feed opening 38, a second feed opening 42 and a discharge opening 37, wherein the diameter of seat 36 is smaller than the diameter of radial seal 41 and wherein compression spring 40 is configured to urge control plunger 39 into a blocking position. When control plunger 39 is in the blocking position, ball 35 will be pressed against seat 36 by compression spring 43. An oil coming from discharge opening 37 will hereby be blocked. Oil coming from feed opening 38 will cause compression spring 43 to be compressed and ball 35 to be lifted off seat 36. An oil flow will thus only be admitted when it comes from feed opening 38.

When a control pressure coming from discharge opening 26 of first sequence valve 20 however presses via feed opening 42 on control plunger 39, this will be urged into a position allowing passage. In this position allowing passage control plunger 39 also urges ball 35 off seat 36, whereby an oil flow between feed opening 38 and discharge opening 37 is admitted in both directions. When the control pressure on control plunger 39 has dropped below a determined value, control plunger 39 is once again urged into the blocking position by compression spring 40.

A second control valve 34 (FIG. 11) comprises a ball 44, a compression spring 47, a seat 46, a control plunger 52, a first radial seal 51, a second radial seal 50, a first feed opening 45, a second feed opening 53, a third feed opening 49 and a discharge opening 48. Seat 46 has a smaller diameter than first radial seal 51, and first radial seal 51 has a smaller diameter than second radial seal 50. When control plunger 52 is in a blocking position, ball 44 will be pressed against seat 46 by compression spring 47. Oil coming from feed opening 45 is hereby blocked. Oil coming from discharge opening 48 will ensure that compression spring 47 is compressed and ball 44 is lifted off seat 46. As such, an oil flow will only be admitted when it comes from discharge opening 48. Feed opening 53 is in contact with supply conduit 3b. When a control pressure presses via feed opening 53 on control plunger 52, this will be urged into a position allowing passage. In this position allowing passage control plunger 52 also urges ball 44 off seat 46, whereby an oil flow between feed opening 45 and discharge opening 48 is admitted in both directions. Because radial seal 50 has a greater diameter than radial seal 51, and because the difference in pressure on the two seals can be no greater than 90 bar due to the minimum drop in pressure between feed opening 25 and discharge opening 26 in first sequence valve 20, control plunger 52 will be urged back into its blocking position when a control pressure coming from discharge opening 26 of first sequence valve 20 presses via feed opening 49 on control plunger 52.

Retracting pin 8b (FIG. 12) comprises a first radial seal 54 and a second radial seal 55 having a greater diameter. Compression spring 31 forces retracting pin 8a into a coupling position. When a control pressure coming from discharge channel 26 of valve 21 presses via feed channel 56 on retracting pin 8b, this will take up a retracted position which defines an uncoupling position. The protruding part of retracting pin 8b is here pulled from groove 30 of sleeve 29, and the mechanical connection between coupling halves 6b and 7b is broken.

Figure 13:
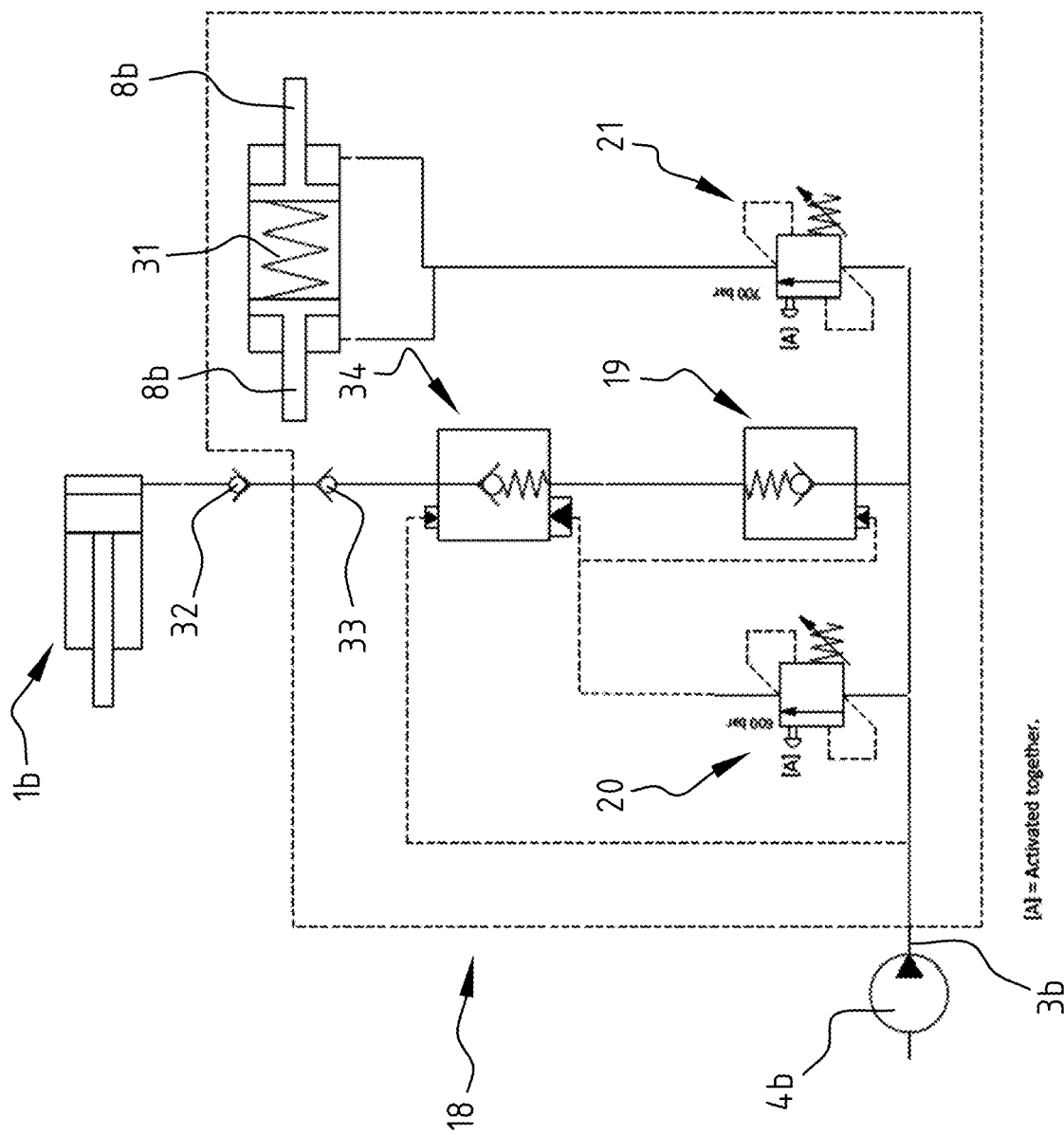
FIG. 13 is a hydraulic diagram of the coupling according to the second preferred embodiment.
Figure 14:
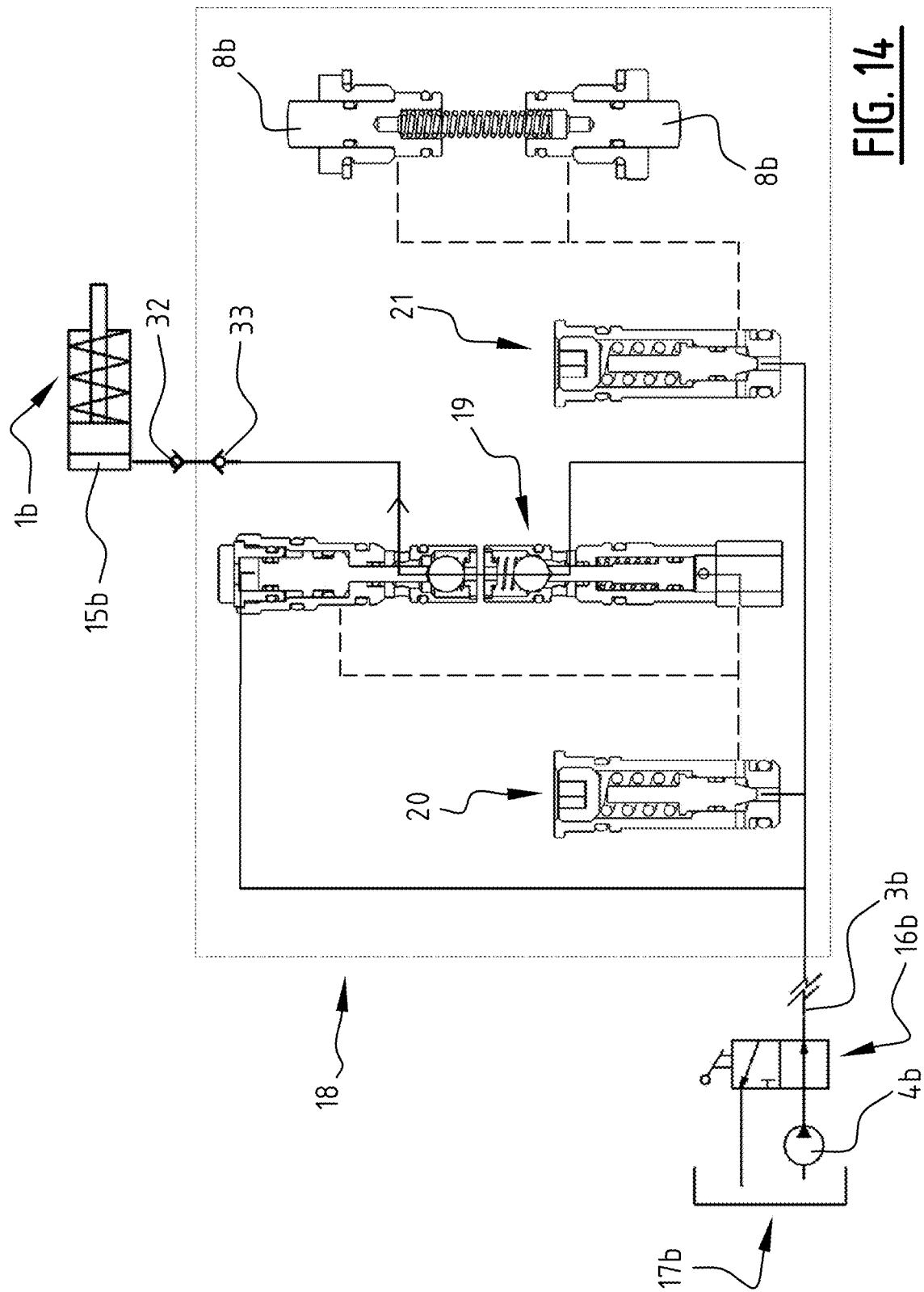
FIG. 14 is a schematic representation of the hydraulic diagram shown in FIG. 13 during an operative function of the coupling.
Figure 15:
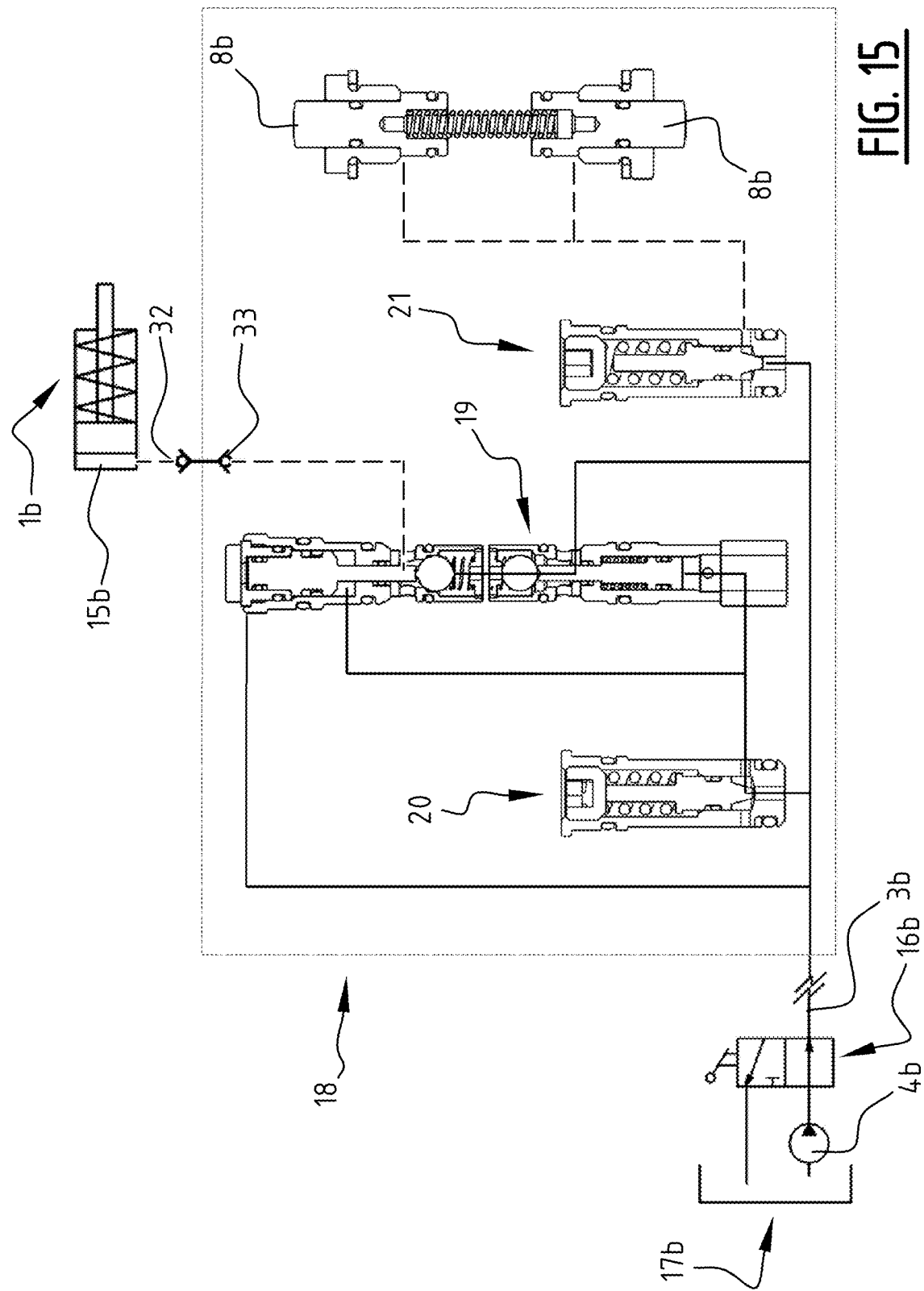
FIG. 15 is a schematic representation of the hydraulic diagram shown in FIG. 13 during an evacuation position setting of the coupling.
Figure 16:
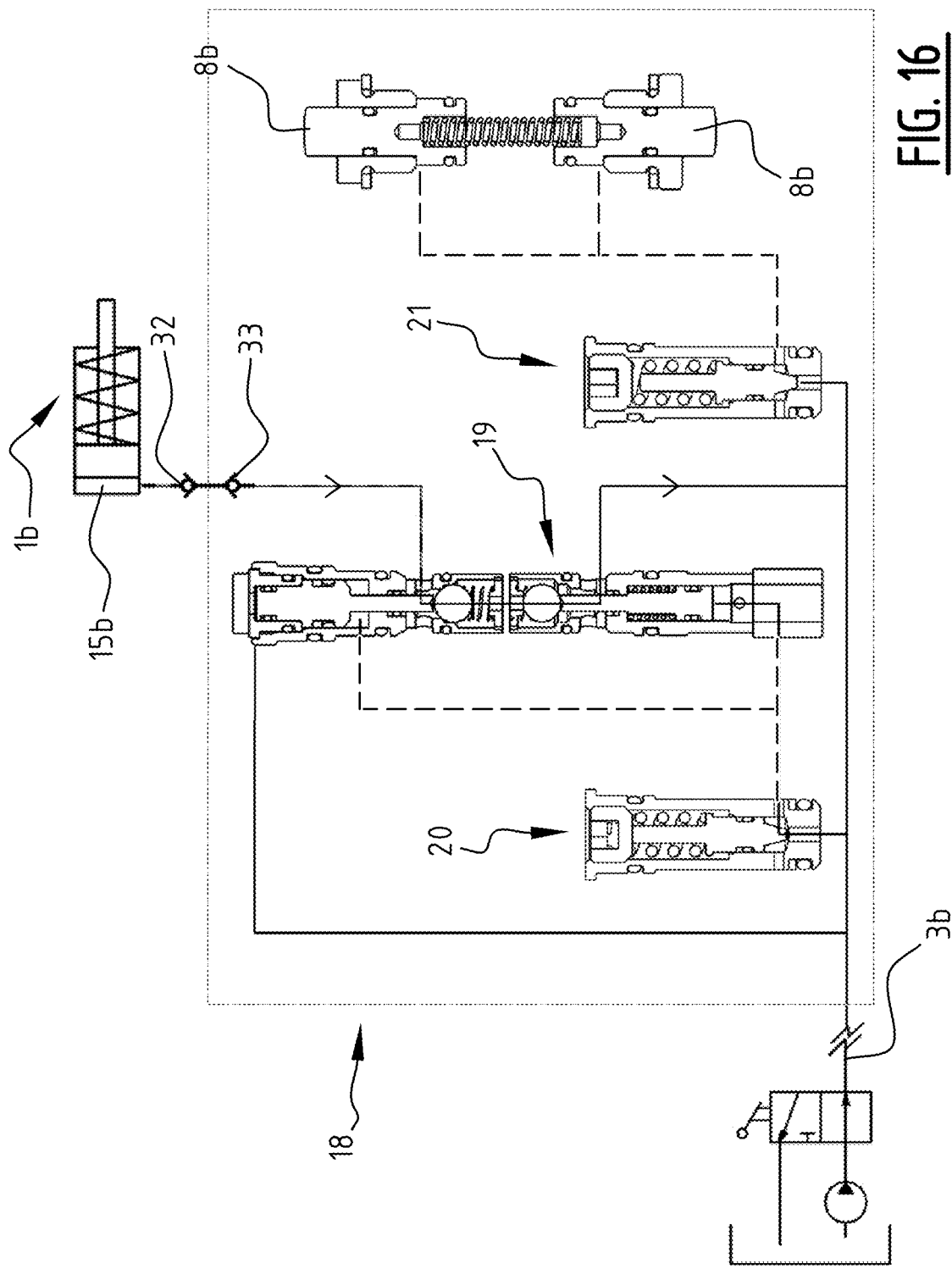
FIG. 16 is a schematic representation of the hydraulic diagram shown in FIG. 13 during an evacuating function of the coupling.
Figure 17:
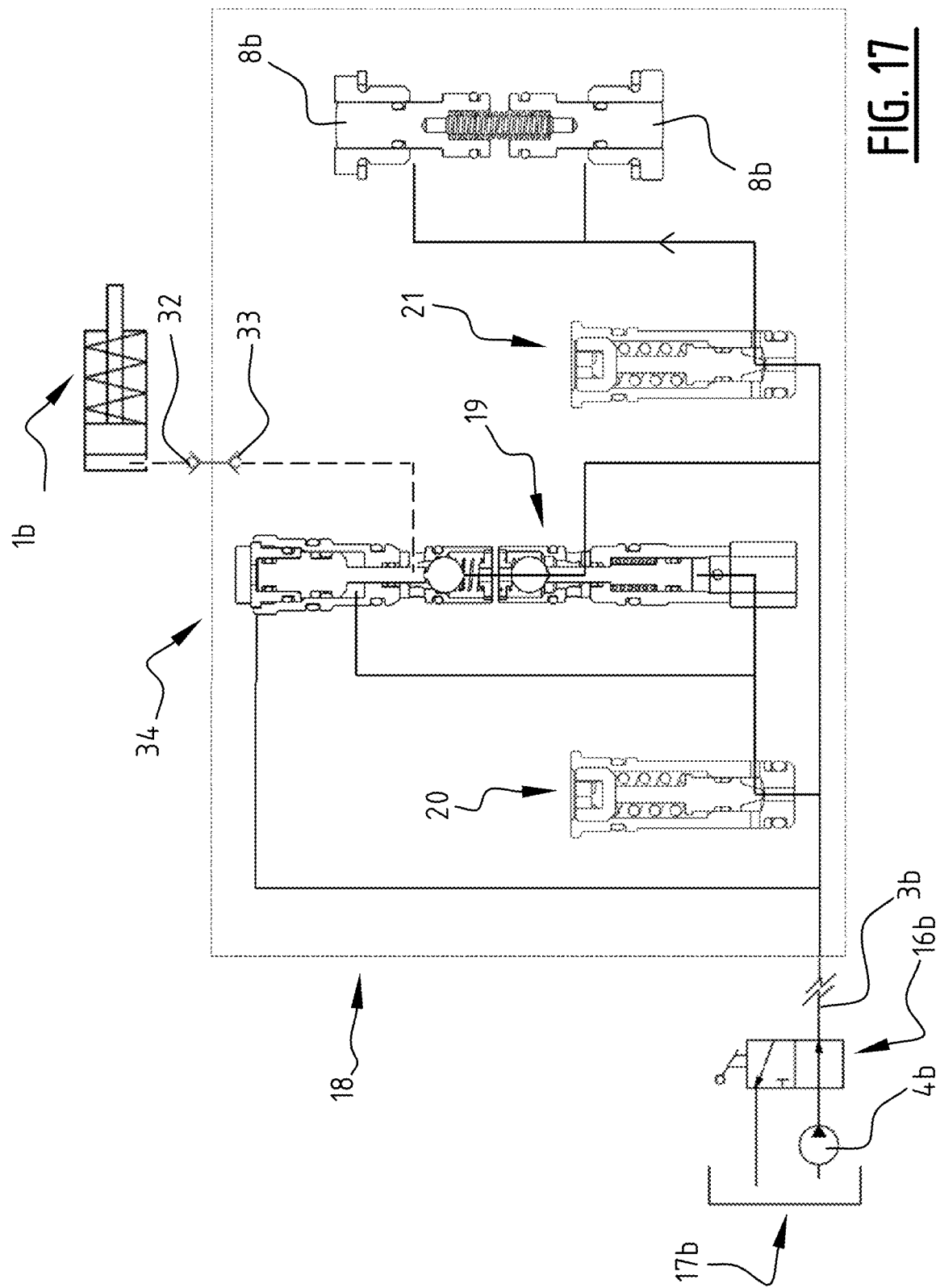
FIG. 17 is a schematic representation of the hydraulic diagram shown in FIG. 13 during an uncoupling function of the coupling.

FIG. 13 shows a schematic representation of a hydraulic diagram of the coupling according to the second preferred embodiment. The operation of the coupling will now be further elucidated with reference to FIGS. 14-17. FIGS. 14-17 correspond to FIG. 13, but are further elucidated by showing therein the respective valves, i.e. the first control valve 19, the first sequence valve 20, the second sequence valve 21 and the second control valve 34, as well as the retracting pins 8b, as physical components.

After installation, the above mentioned operative function (FIG. 14) can be carried out. An operating pressure of 500 bar is applied by pump 4b in supply conduit 3b and therefore in cylinder chamber 15b. Cylinder 1b will thus fulfil the function for which it is intended in normal operation. Control plunger 52 of valve 34 will be urged into its second position due to the pressure in supply conduit 3b. The oil flow through valve 34 will hereby be admitted in both directions. Control plunger 39 of valve 19 is urged into its first position by compression spring 40, whereby valve 19 will admit only an oil flow in the direction of cylinder 1b. If desired, the pressure can hereby be relieved from feed conduit 3b by means of valve 16b without cylinder chamber 15b being relieved. This reduces the risk of a broken conduit.

The above mentioned and optional evacuating function (FIG. 15) is activated when pump 4b increases the pressure in conduit 3b, valve assembly 18 and cylinder assembly 1b to 600 bar. Cone 27 of first sequence valve 20 opens hereby, after which the pressurized liquid flows via discharge opening 26 of first sequence valve 20 to feed opening 42 of first control valve 19 and to feed opening 49 of second control valve 34. Control plunger 39 of first control valve 19 hereby moves to its second position, whereby first control valve 19 admits an oil flow in both directions. Control plunger 52 of second control valve 34 moves back to its first position, and second control valve 34 will thereby allow only an oil flow from cylinder assembly 1b to pump 4b. When the pressure of supply conduit 3b is relieved by means of valve 16b, the oil will flow from cylinder chamber 15b back into tank 17b. Cylinder assembly 1b will hereby be relieved and be retracted at least partially. When cylinder assembly 1b has been retracted to sufficient extent, the above mentioned uncoupling function can be activated. Pump 4b once again builds up pressure in supply conduit 3b and valve assembly 18. Because the second control valve 34 blocks oil flow in the direction of cylinder assembly 1b, the oil will not flow into cylinder chamber 15b. The pressure is built up further to 700 bar, after which the second sequence valve 21 opens. Retracting pin 8b is retracted via discharge opening 26 of second sequence valve 21 such that coupling halves 6b and 7b are no longer mechanically fixed and are pressed apart by compression spring 14b. Non-return valves 32 and 33 in the two coupling halves 6b and 7b fall shut, whereby the remaining oil from cylinder chamber 15b or supply conduit 3b cannot leak out.

Figure 18:
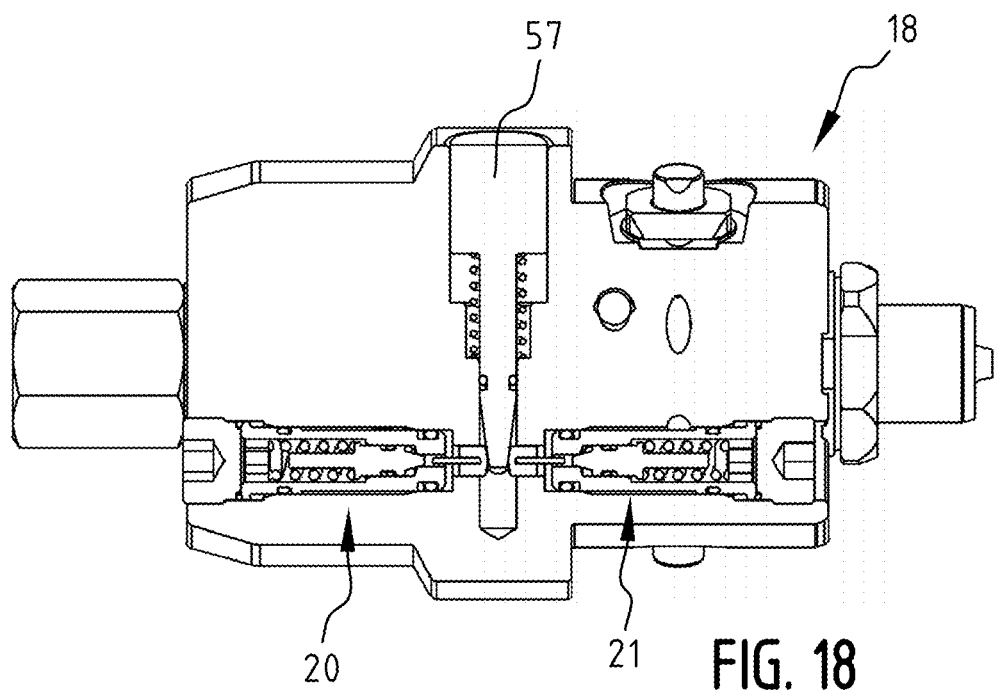
FIG. 18 is a cross-sectional view of the coupling with a mechanism for resetting the control valves shown in FIGS. 10 and 11.
Figure 19:
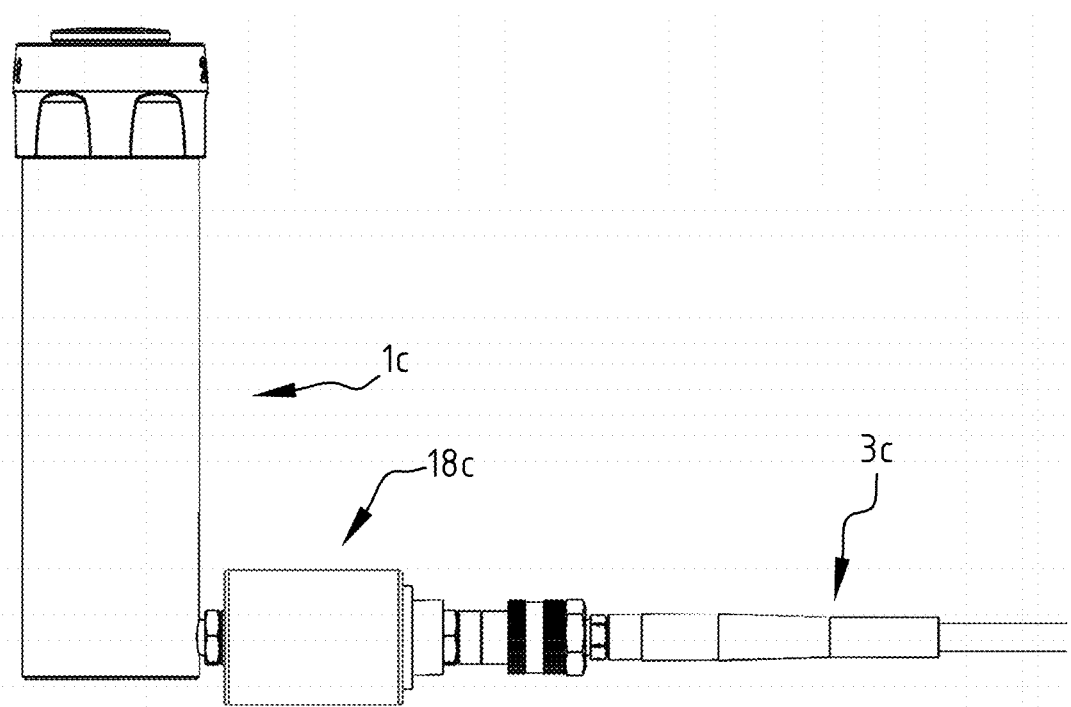
FIG. 19 is a side view of a cylinder which is coupled with a coupling according to a third preferred embodiment to a supply conduit.

After the described functions have been performed, valve assembly 18 can be retrieved by the user. Control valves 19 and 34 must be reset in order to be used again. Control pin 27 of both valve 20 and valve 21 are pushed in simultaneously by means of pressing push button 57 (FIG. 18). All remaining residual pressure can hereby disappear, and all valves hereby move to their original starting position.

Figure 20:
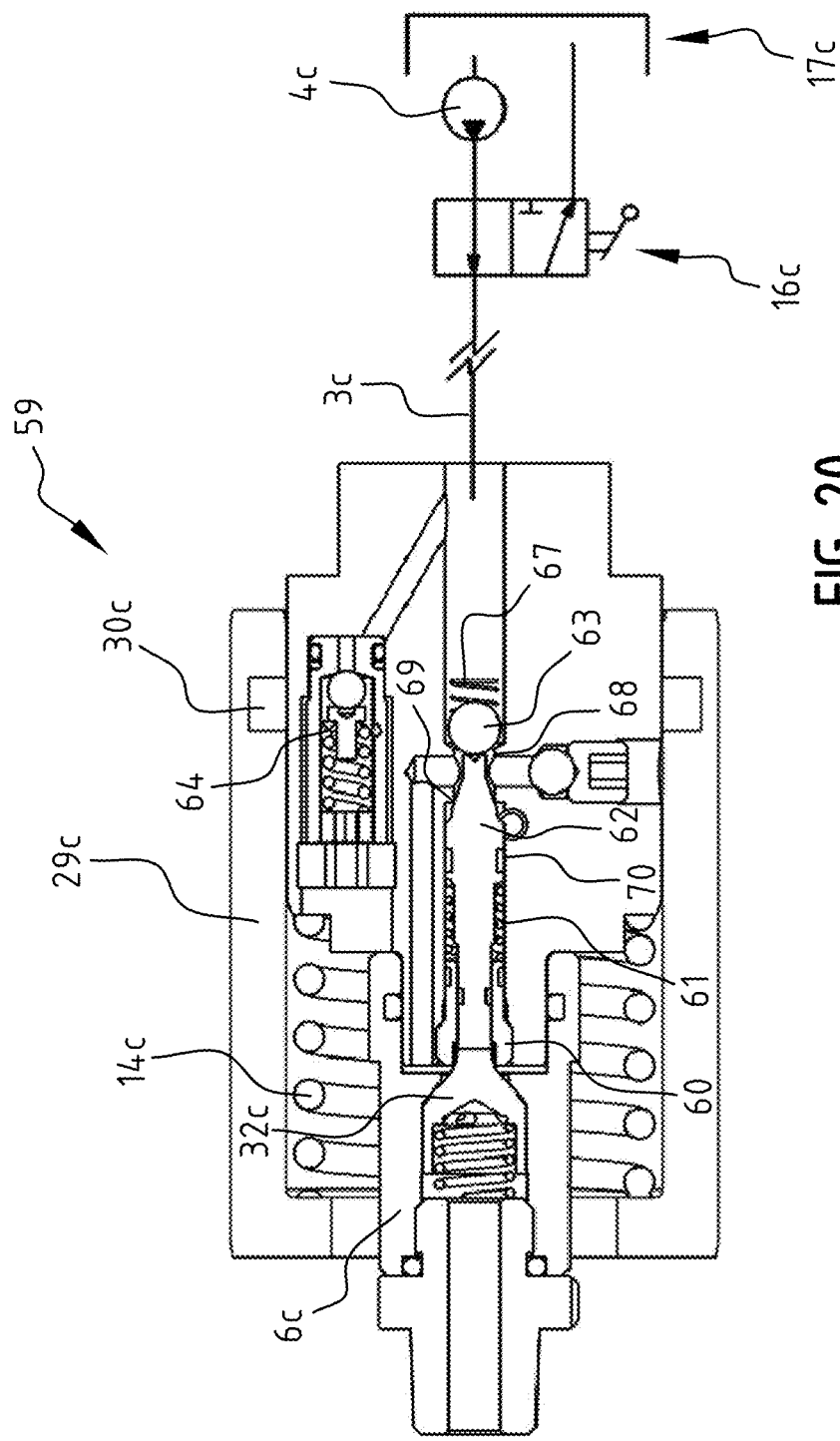
FIG. 20 is a schematic cross-sectional view of the coupling according to the third preferred embodiment.
Figure 21A:
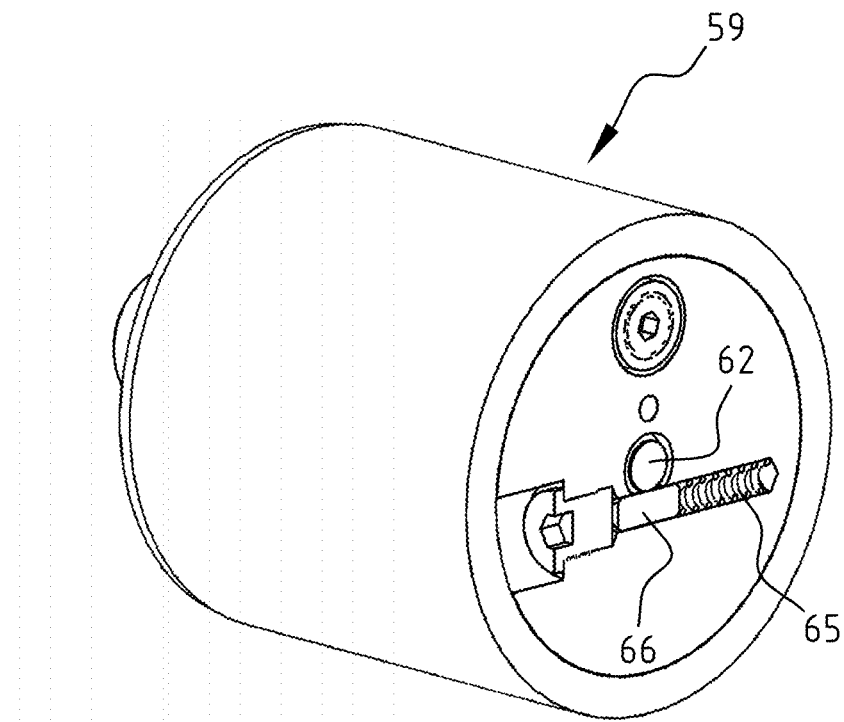
FIG. 21A is a cross-sectional view of the coupling according to the third preferred embodiment with a blocking pin in a blocking position.
Figure 21B:
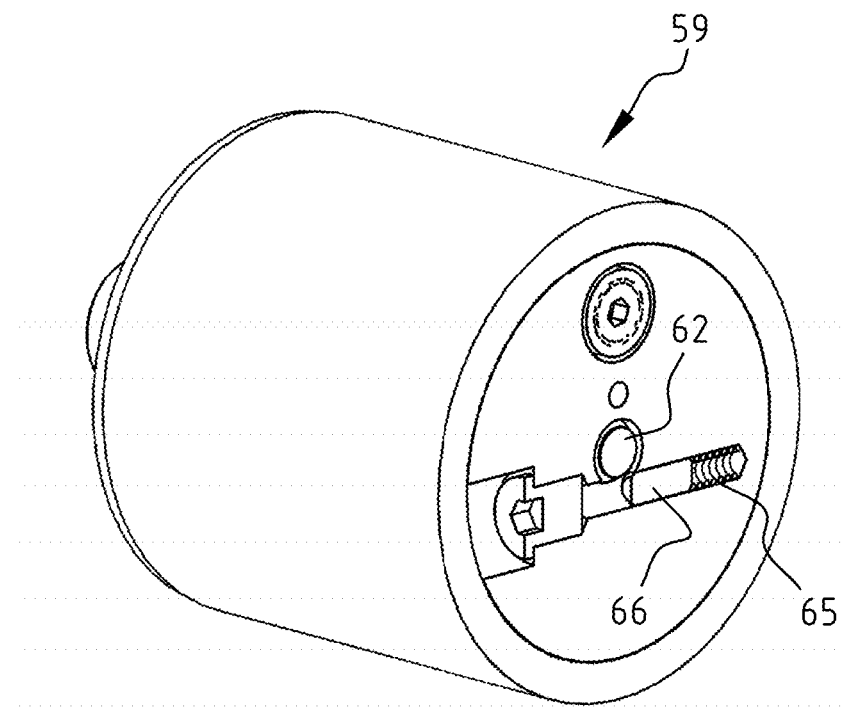
FIG. 21B is a cross-sectional view of the coupling according to the third preferred embodiment with a blocking pin in a non-blocking position.
Figure 22A:
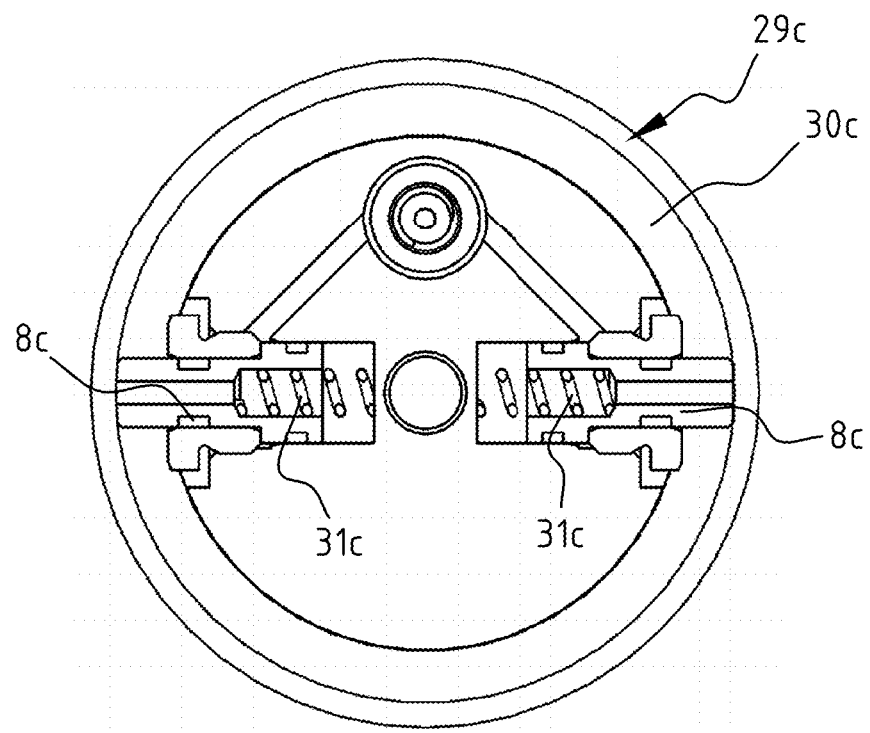
FIG. 22A is a cross-sectional view of the coupling according to the third preferred embodiment with the retracting pins in a coupled position.
Figure 22B:
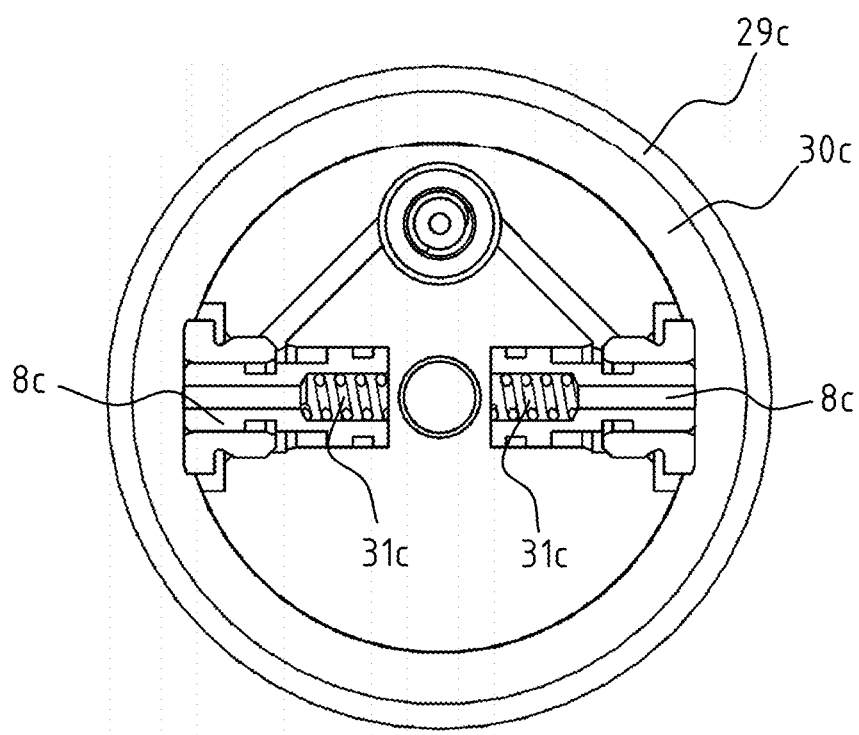
FIG. 22B is a cross-sectional view of the coupling according to the third preferred embodiment with the retracting pins in an uncoupled position.
Figure 23:
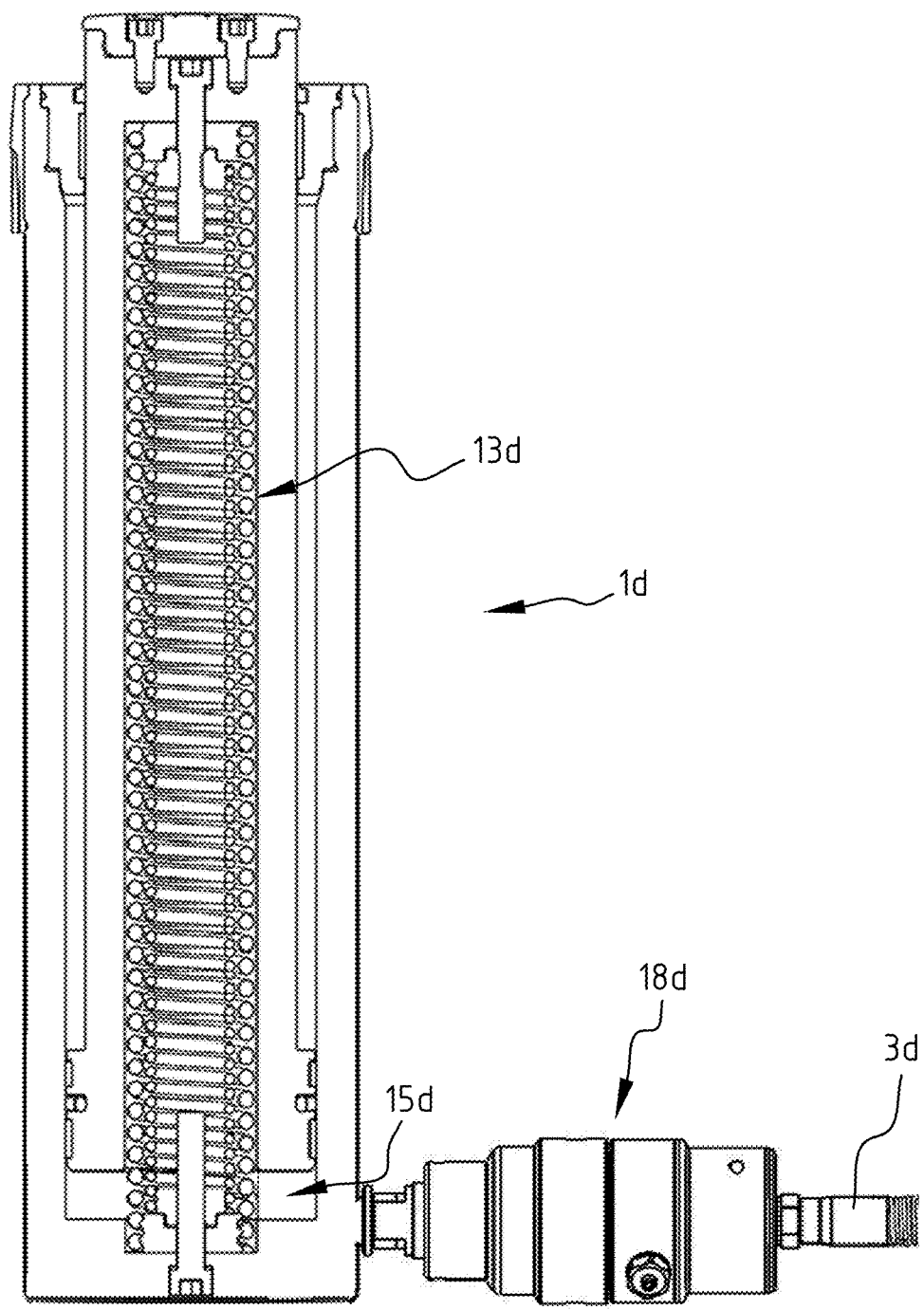
FIG. 23 is a schematic cross-section of a cylinder which is coupled with a coupling according to a fourth preferred embodiment to a supply conduit.
Figure 24:
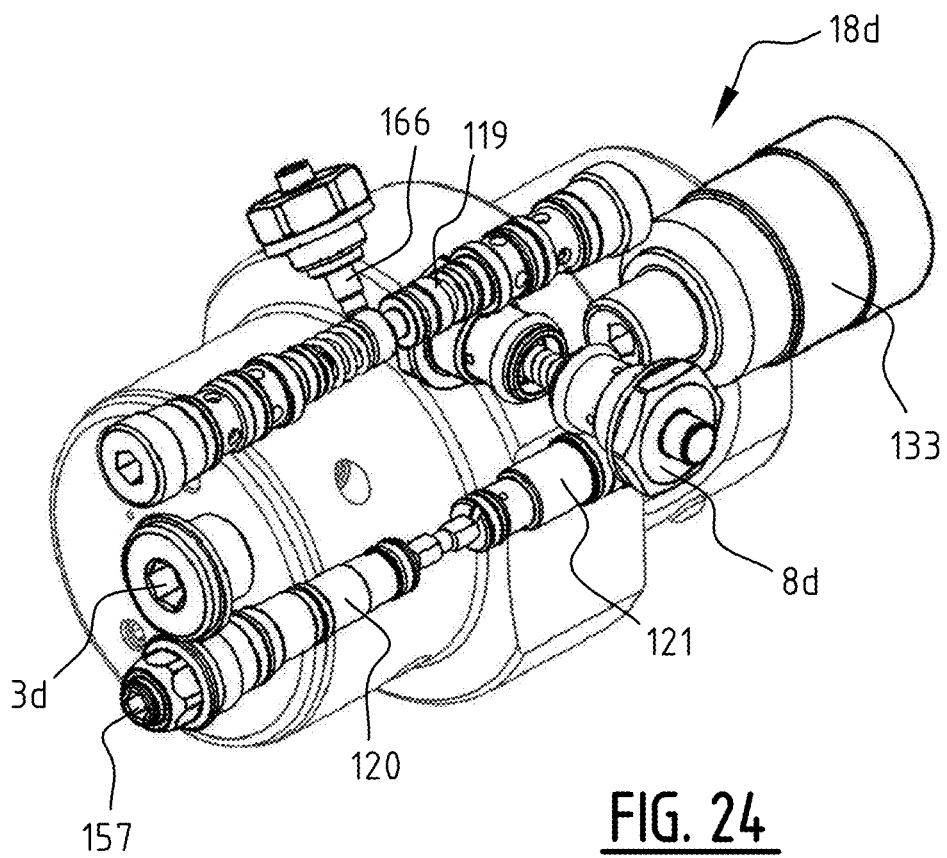
FIG. 24 is a perspective semi-transparent view of the coupling according to the fourth preferred embodiment.
Figure 25:
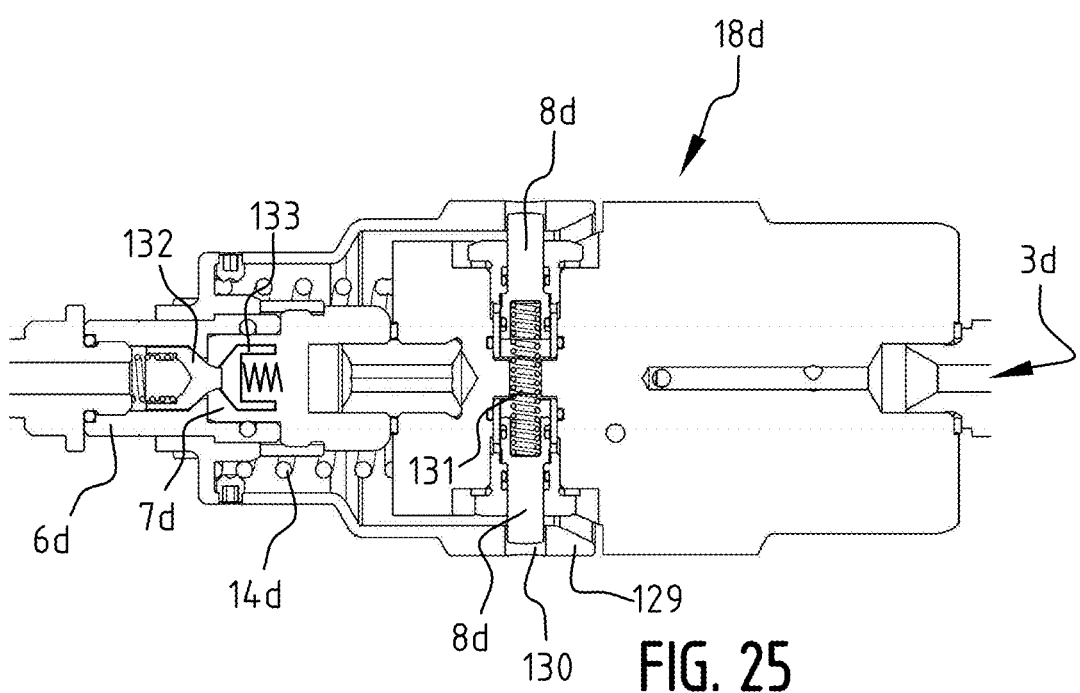
FIG. 25 is a cross-sectional view of the coupling shown in FIGS. 23 and 24.
Figure 26:
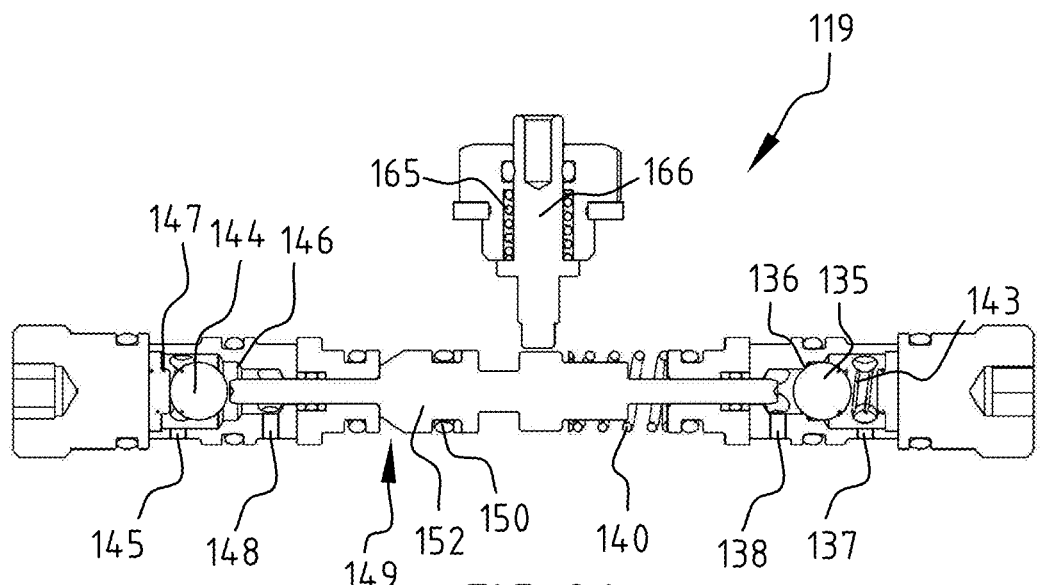
FIG. 26 is a cross-sectional view of the control valve in a first position of the coupling shown in FIGS. 23 and 24.
Figure 27:
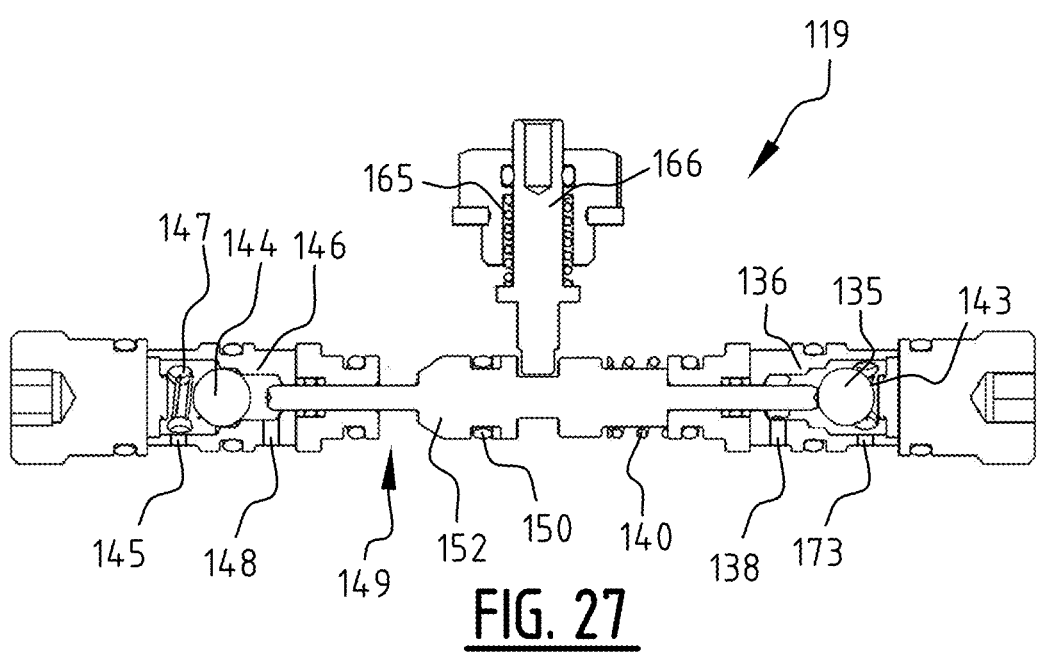
FIG. 27 is a cross-sectional view of the control valve in a second position of the coupling shown in FIGS. 23 and 24.
Figure 28:
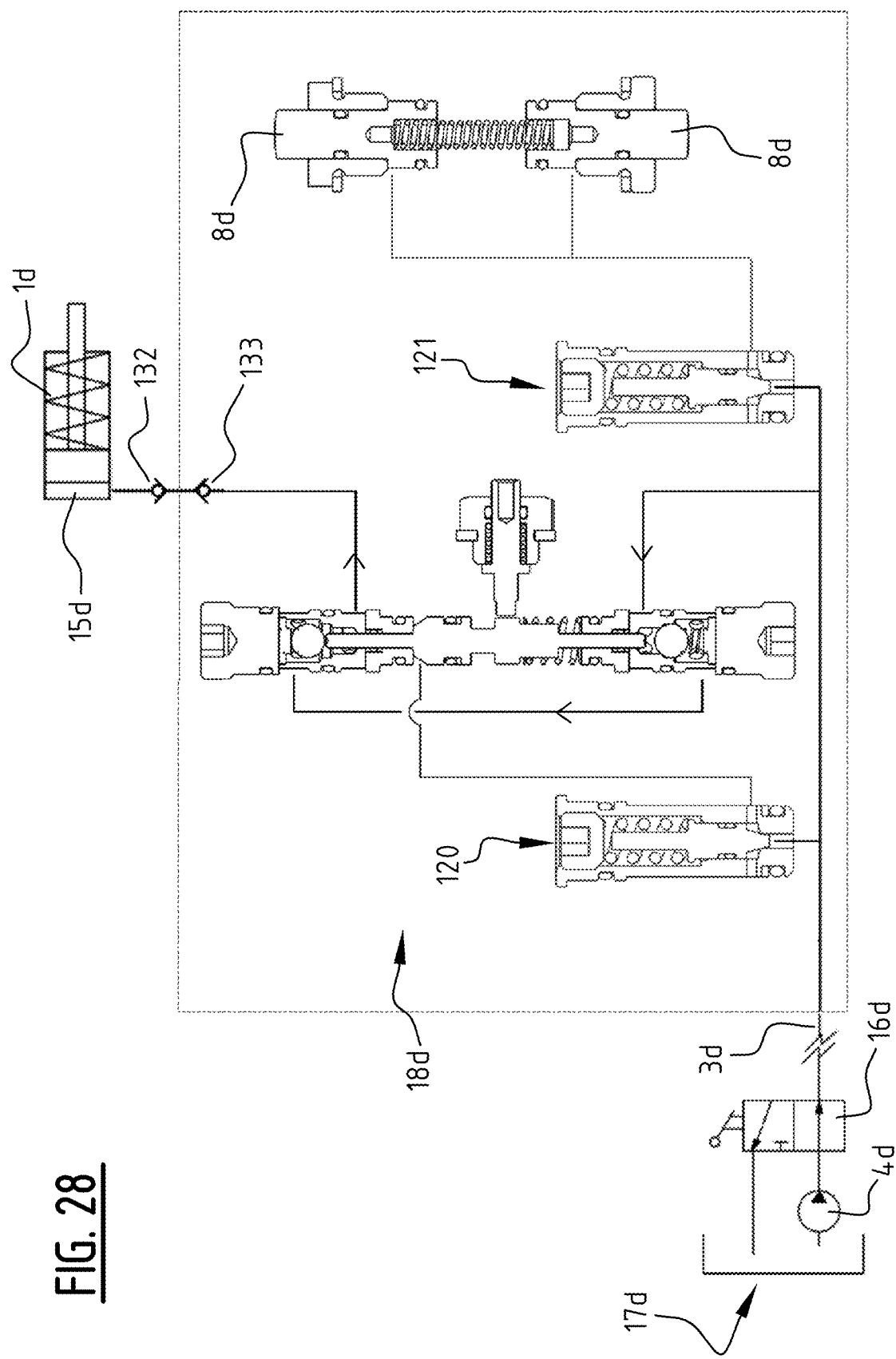
FIG. 28 is a hydraulic diagram of the coupling shown in FIGS. 23 and 24 during an operative function of the coupling.
Figure 29:
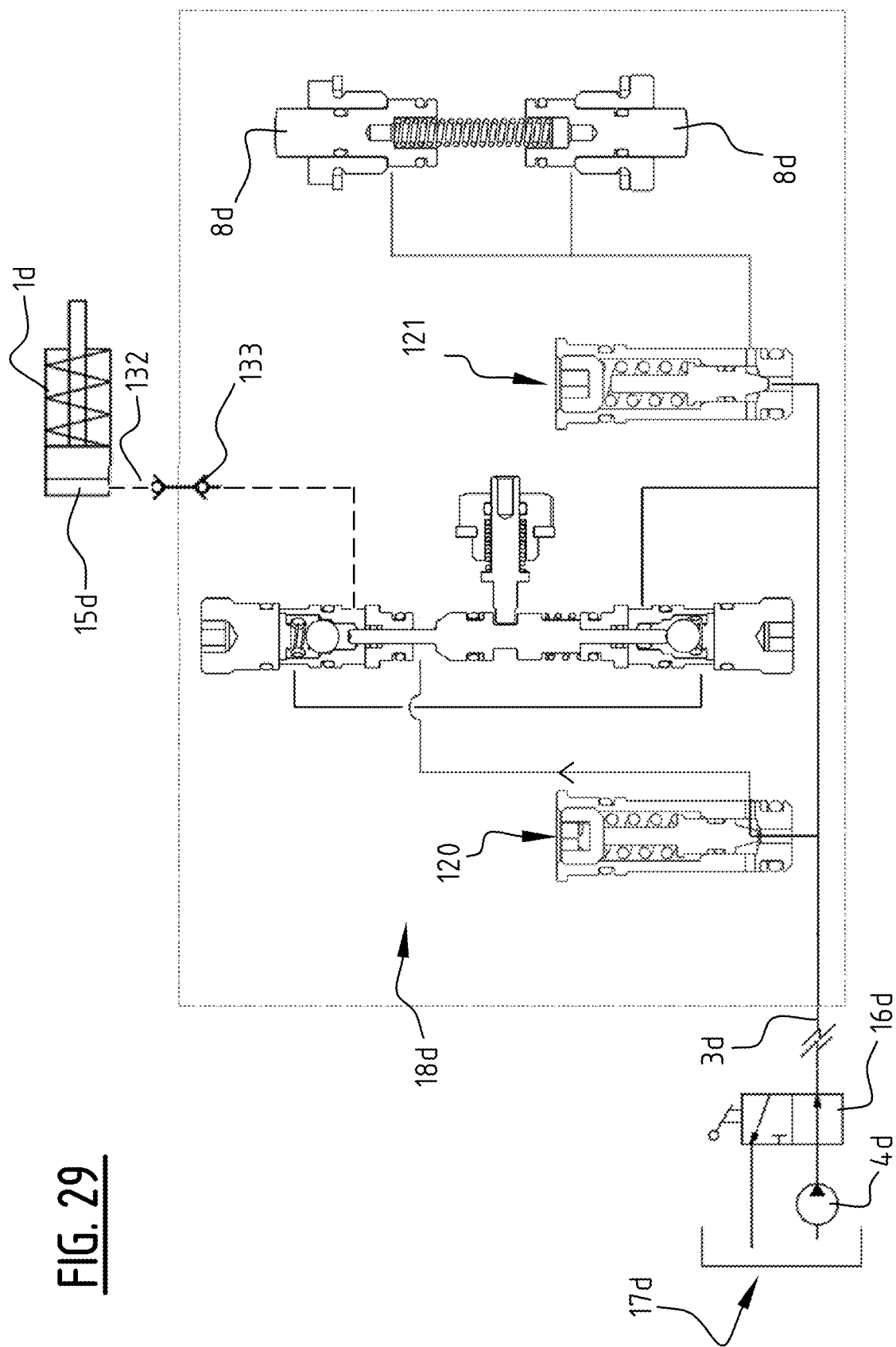
FIG. 29 is a hydraulic diagram of the coupling shown in FIGS. 23 and 24 during an evacuation position setting of the coupling.
Figure 30:
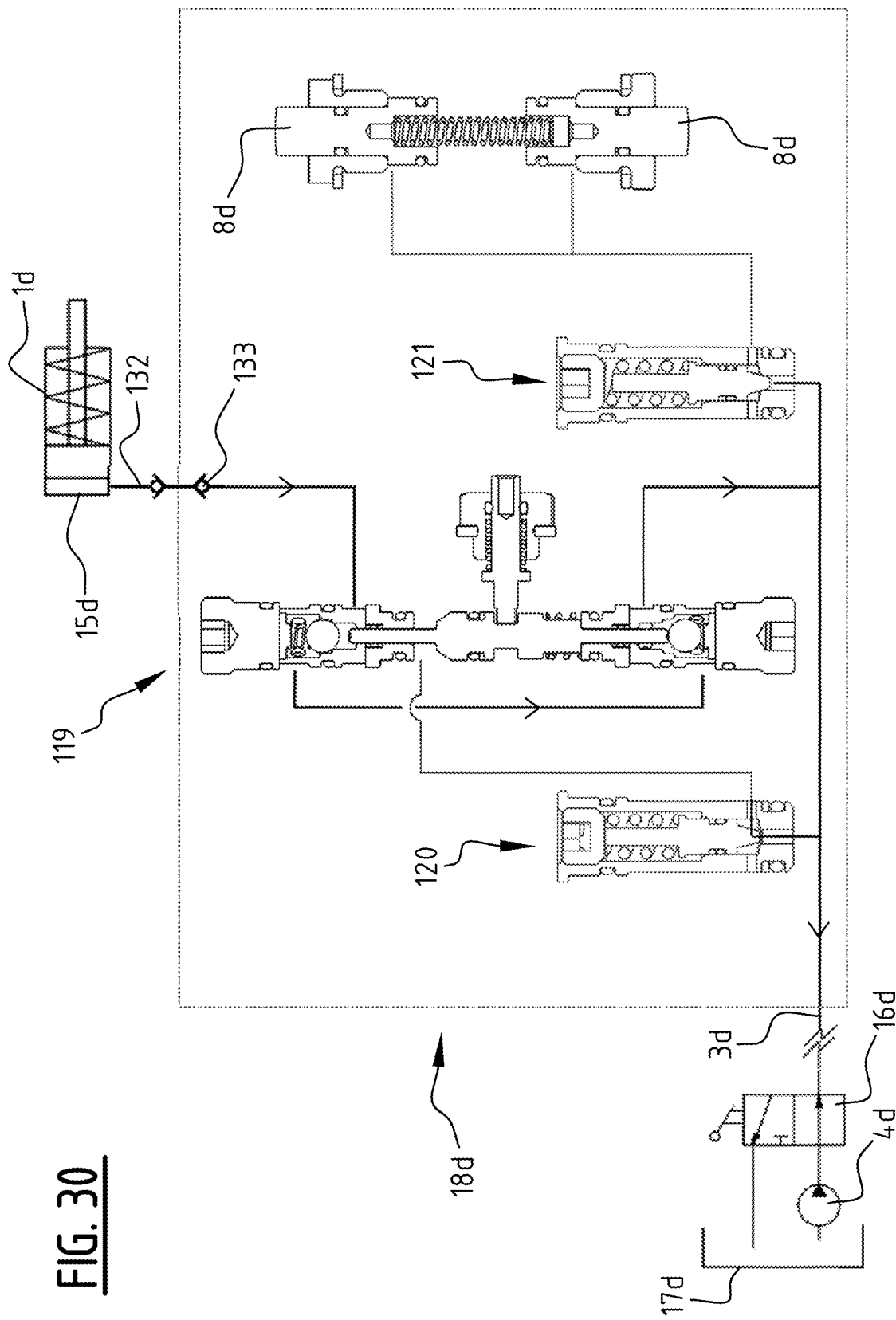
FIG. 30 is a hydraulic diagram of the coupling shown in FIGS. 23 and 24 during an evacuating function of the coupling.
Figure 31:
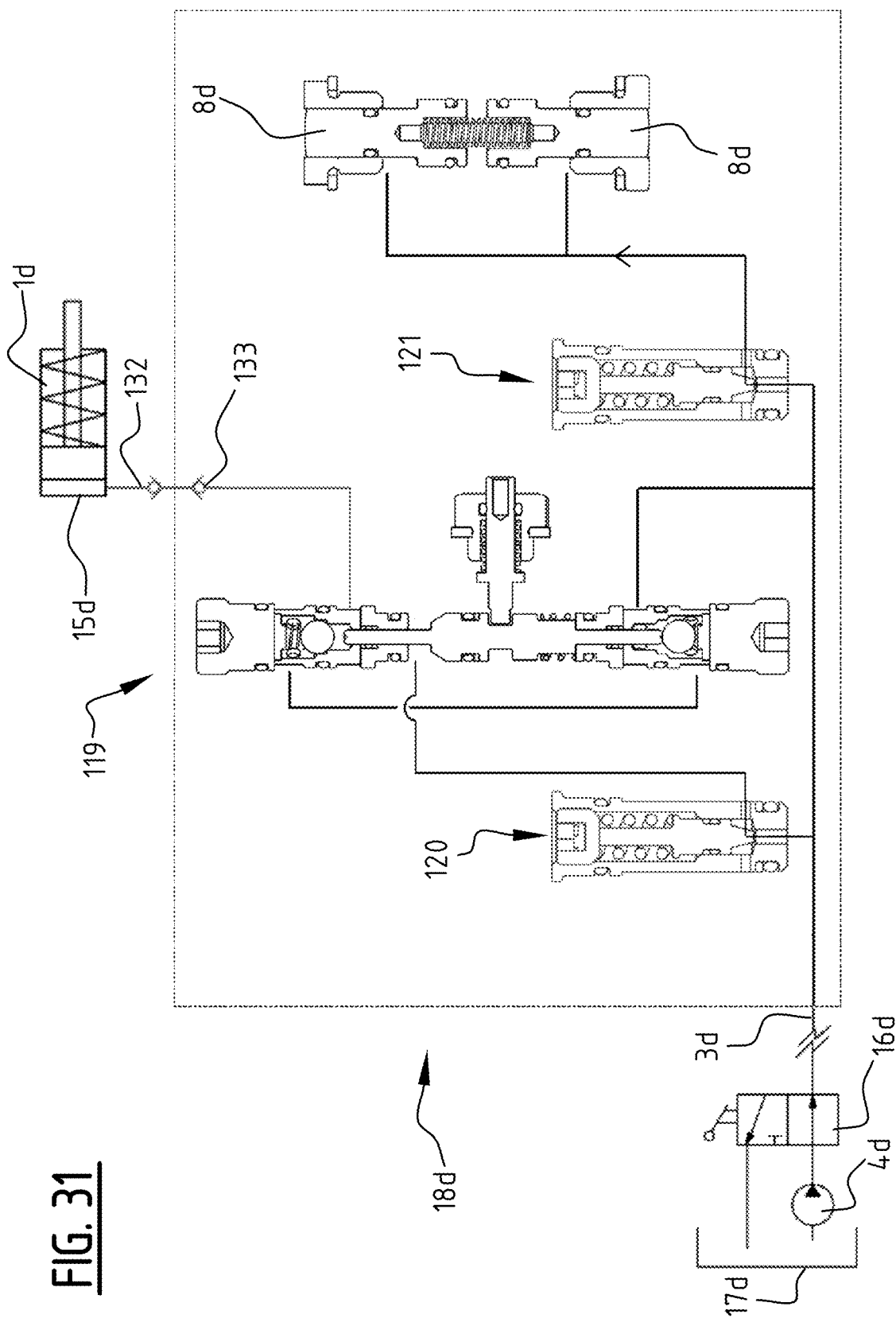
FIG. 31 is a hydraulic diagram of the coupling shown in FIGS. 23 and 24 during an uncoupling function of the coupling.

A third preferred embodiment is shown in FIGS. 19-24. FIG. 20 shows that cylinder assembly 1c is connected to female coupling half 6c and male coupling half 59 is connected to supply conduit 3b. Positioned between the two coupling halves 6c and 59 is compression spring 14c. During installation of cylinder assembly 1c relative to coupling half 59 compression spring 14b is compressed and the two coupling halves 6c and 59 are mechanically fixed by at least one retracting pin 8c which is urged by compression spring 31c into groove 30c of sleeve 29c. Coupling half 6c comprises a non-return valve 32c which allows an oil flow in the direction of cylinder assembly 1c and blocks it in the other direction. Coupling half 59 comprises an adjusting screw 60, a first compression spring 61, a second compression spring 65, a third compression spring 67, a control plunger 62, a blocking pin 66, a ball 63, a first seat 68, a second seat 69, a radial seal 70, at least one retracting pin 8c and a switch-over valve 64 which opens at 700 bar. Using adjusting screw 60, compression spring 61 can be set such that control plunger 62 opens at an operating pressure of 600 bar in a first position in which it rests on seat 69. Because radial seal 70 has a greater diameter than seat 69, control plunger 62 takes up a second, retracted position after opening. This second position of control plunger 62 is mechanically secured by blocking pin 66 which is pressed in front of control plunger 62 by compression spring 65 (FIGS. 21A and 21B).

When control plunger 62 is in its first position, ball 63 is pressed off seat 68, and when control plunger 62 is in its second position, ball 63 is pressed by compression spring 67 back onto its seat 68. Non-return valve 32c of coupling half 6c is then pressed open by control plunger 62. When the switch-over valve 64, set to 700 bar, is opened, the oil therebehind presses retracting pin 8c into a retracted position, whereby it no longer protrudes into groove 30c of sleeve 29c. At that moment coupling halves 6c and 59 are no longer mechanically fixed and compression spring 14c presses the two coupling halves apart.

After installation, the above mentioned operative function can be carried out. An operating pressure of 500 bar is applied by pump 4c in supply conduit 3c and therefore in cylinder chamber 15c. As such, cylinder 1c will fulfil the function for which it is intended in normal operation. Control plunger 62 is in its first position, whereby the oil flow through non-return valve 32c will only be admitted in the direction of cylinder assembly 1c. If desired, the pressure from feed conduit 3c can hereby be relieved by means of valve 16c, without cylinder chamber 15c being relieved. This reduces the risk of a broken conduit.

The above mentioned and optional evacuating function is activated when pump 4c increases the pressure in conduit 3c, coupling half 59 and cylinder assembly 1 to 600 bar. Control plunger 62 hereby moves to its second position, after which non-return valve 32c is opened, ball 63 falls onto seat 68, and hereby allows only an oil flow from cylinder assembly 1c to pump 4c. When the pressure of supply conduit 3c is relieved by means of valve 16c, the oil will flow from cylinder chamber 15c back into tank 17c. Cylinder assembly 1c will hereby be relieved and be retracted at least partially. When cylinder assembly 1c has been retracted to sufficient extent, the above mentioned uncoupling function can be activated. Pump 4c once again builds up pressure in supply conduit 3c and coupling half 59. Because ball 63 blocks oil flow in the direction of cylinder assembly 1c, the oil will not flow into cylinder chamber 15c. The pressure is built up further to 700 bar, after which switch-over valve 64 opens. Retracting pin 8c is retracted such that coupling halves 6c and 59 are no longer mechanically fixed and are pressed apart by compression spring 14c. The non-return valve 32c in coupling half 6c falls shut, ball 63 was already shut, whereby the remaining oil from cylinder chamber 15c or supply conduit 3c cannot leak out.

After the described functions have been performed, coupling half 59 must be reset manually. This is done by urging blocking pin 66 back into its retracted position.

Finally, it should be noted that the solution provided by the present disclosure to the problem of oil leakage can also be realized in other ways, within the scope of the present disclosure.

A fourth preferred embodiment of a controllable coupling is shown in FIGS. 23-34. This fourth preferred embodiment has many similarities to the second preferred embodiment shown in FIGS. 7-18, but differs therefrom in that the fourth preferred embodiment is able with a single control valve 119 to fulfil the functionality of control valves 19 and 34 of the second preferred embodiment. Another addition relative to the second preferred embodiment is that the fourth preferred embodiment comprises a mechanical blocking, which is a similarity to the third preferred embodiment shown in FIGS. 19-22B.

In the fourth preferred embodiment a cylinder assembly 1d is connected to a female coupling half 6d and a valve assembly 18d is connected to a male coupling half 7d and to a supply conduit 3d. Positioned between the two coupling halves 6d and 7d is a compression spring 14d. During installation of the cylinder assembly 1d relative to the valve assembly 18d the compression spring 14d is compressed and the two coupling halves 6d and 7d are mechanically fixed by at least one retracting pin 8d which is forced into a groove 130 of a sleeve 129 by a compression spring 131. Coupling halves 6d and 7d each comprise a non-return valve 132, 133 which, when the two coupling halves 6d, 7d are coupled, press each other open. When coupling halves 6d, 7d are however uncoupled, non-return valves 132, 133 fall shut and thus prevent oil leakage.

Sequence valves 120 and 121 (FIG. 33) both comprise an adjusting screw 128, a compression spring 124, a cone 127, a seat 122, a radial seal 123, a feed opening 125 and a discharge opening 126, wherein the diameter of seat 122 is substantially smaller than the diameter of radial seal 123. Cone 127 is pressed with a determined force into seat 122 by adjusting compression spring 124 by means of tightening adjusting screw 128. When a pressurized liquid is applied to feed opening 125, a force is created on cone 127 in the direction of compression spring 124. When the pressure rises to a predetermined or pre-set threshold value, which differs for the sequence valves 120 and 121, the cone will be pressed out of seat 122. The pressure value necessary for this purpose is adjustable by pressing compression spring 124 against cone 127 with more or less force by means of tightening adjusting screw 128. When cone 127 is pressed out of seat 122, the pressurized liquid will press against radial seal 123. Due to a difference in diameter between seat 122 and radial seal 123, cone 127 will then fall back onto seat 122 again at a substantially lower pressure. The pressure drop between feed opening 125 and discharge opening 126 is hereby minimized Compression spring 124 of first sequence valve 120 is set such that cone 127 of first sequence valve 120 opens at an operating pressure of 600 bar and closes at an operating pressure of 90 bar. Compression spring 124 of second sequence valve 121 is set such that cone 127 of second sequence valve 121 opens at an operating pressure of 700 bar and closes at an operating pressure of 100 bar.

A control valve 119 (FIGS. 26 and 27) comprises a first ball 135, a second ball 144, a first seat 136, a second seat 146, a control plunger 152, a first compression spring 140, a second compression spring 143, a third compression spring 147, a fourth compression spring 165, a locking pin 166, a radial seal 150, a first feed opening 138, a second feed opening 145, a third feed opening 149, a first discharge opening 137 and a second discharge opening 148, wherein the diameter of seat 136 is smaller than the diameter of radial seal 150 and wherein compression spring 140 is configured to urge control plunger 152 into a first position. When control plunger 152 is in a first position (FIG. 26), ball 135 will be pressed by compression spring 143 against seat 136. Ball 144 will then be lifted off seat 146 by control plunger 152, counter to the spring force of compression spring 147. Oil coming from discharge opening 137 is hereby blocked, and oil coming from feed opening 145 is admitted. Oil pressure in feed opening 149, this coming from discharge opening 126 of sequence valve 120, will ensure that compression spring 140 is compressed and that control plunger 152 is urged into a second position. When control plunger 152 is in a second position, locking pin 166 moves by means of compression spring 165 to an extended position and locks control plunger 152 in the second position. When control plunger 152 is in a second position (FIG. 27), ball 144 will be pressed against seat 146 by compression spring 147. Ball 135 will then be lifted off seat 136 by control plunger 152, counter to the spring force of compression spring 143. Oil coming from discharge opening 145 is hereby blocked, and oil coming from feed opening 137 is admitted. Irrespective of the position of control plunger 152, oil coming from discharge opening 148 and flowing toward feed opening 145 and coming from discharge opening 138 and flowing toward feed opening 137 is admitted.

Retracting pin 8d (FIG. 34) comprises a first radial seal 154 and a second radial seal 155. The second radial seal 155 has a larger diameter than the first radial seal 154. Compression spring 131 forces retracting pin 8d into a coupling position. When a control pressure coming from discharge channel 126 of valve 121 presses via feed channel 156 on retracting pin 8d, this will take up a retracted position which defines uncoupling position. The protruding part of retracting pin 8d is here pulled from groove 130 of sleeve 129 and the mechanical connection between coupling halves 6d and 7d is broken.

The operation of the coupling will now be further elucidated with reference to FIGS. 28-31. After installation, the above mentioned operative function (FIG. 28) can be carried out. An operating pressure of up to 500 bar is applied by pump 4d in supply conduit 3d and therefore in cylinder chamber 15d. In this state cylinder 1d will thus fulfil the function for which it is intended in normal operation. Control plunger 152 is urged into its first position by compression spring 140 of control valve 119. The oil flow along ball 144 will hereby be admitted in both directions, and an oil flow along ball 135 is only admitted in the direction of cylinder 1d. If desired, the pressure from feed conduit 3d can be relieved by means of valve 16d without cylinder chamber 15d being relieved. This reduces the impact of a broken conduit and eliminates dynamic phenomena as a result of the flexible conduits. The above mentioned and optional evacuating function (FIG. 29) is activated when pump 4d raises the pressure in conduit 3b, valve assembly 18d and cylinder assembly 1d to 600 bar. Cone 127 of first sequence valve 120 opens hereby, after which the pressurized liquid flows via discharge opening 126 of first sequence valve 120 to feed opening 149 of control valve 119. Control plunger 152 of control valve 119 hereby moves to its second position and is locked therein by means of locking pin 166. In this second position control valve 119 admits oil flow along ball 135 in both directions and oil flow along ball 144 is admitted only from cylinder 1d. When the pressure of supply conduit 3d is relieved by means of valve 16d, the oil will flow from cylinder chamber 15d back into tank 17d. Cylinder assembly 1d will hereby be relieved and be retracted at least partially. When cylinder assembly 1d has been retracted to sufficient extent, the above mentioned uncoupling function can be activated. Pump 4d once again builds up pressure in supply conduit 3d and valve assembly 18d, but because ball 144 of control valve 119 blocks an oil flow in the direction of cylinder assembly 1d, the oil will not flow into cylinder chamber 15d. The pressure is built up further to 700 bar, after which second sequence valve 121 opens. Via discharge opening 126 of second sequence valve 121 retracting pin 8d is retracted such that coupling halves 6d and 7d are no longer mechanically fixed and are pressed apart by compression spring 14d. Non-return valves 132 and 133 in the two coupling halves 6d and 7d fall shut, whereby the remaining oil from cylinder chamber 15d or supply conduit 3d cannot leak out.

Figure 32:
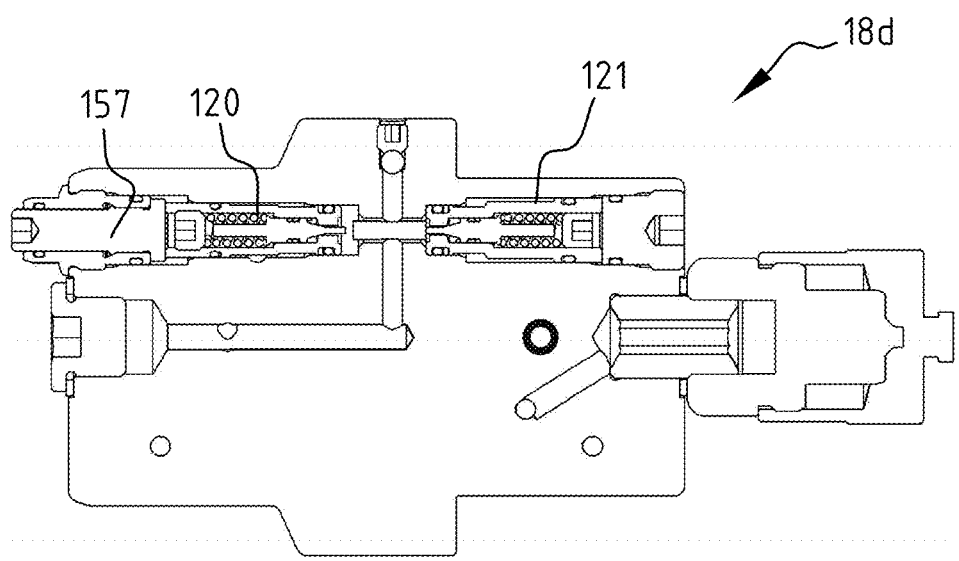
FIG. 32 is a cross-sectional view of the coupling with a mechanism for resetting the control valve shown in FIGS. 26 and 27.
Figure 33:
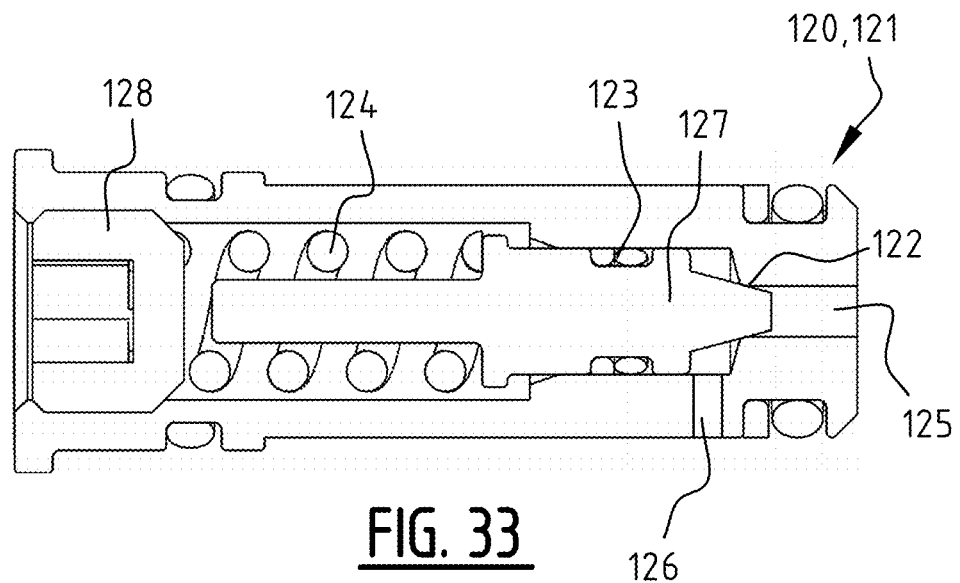
FIG. 33 is a cross-sectional view of a first and a second sequence valve of the coupling shown in FIGS. 23 and 24.
Figure 34:
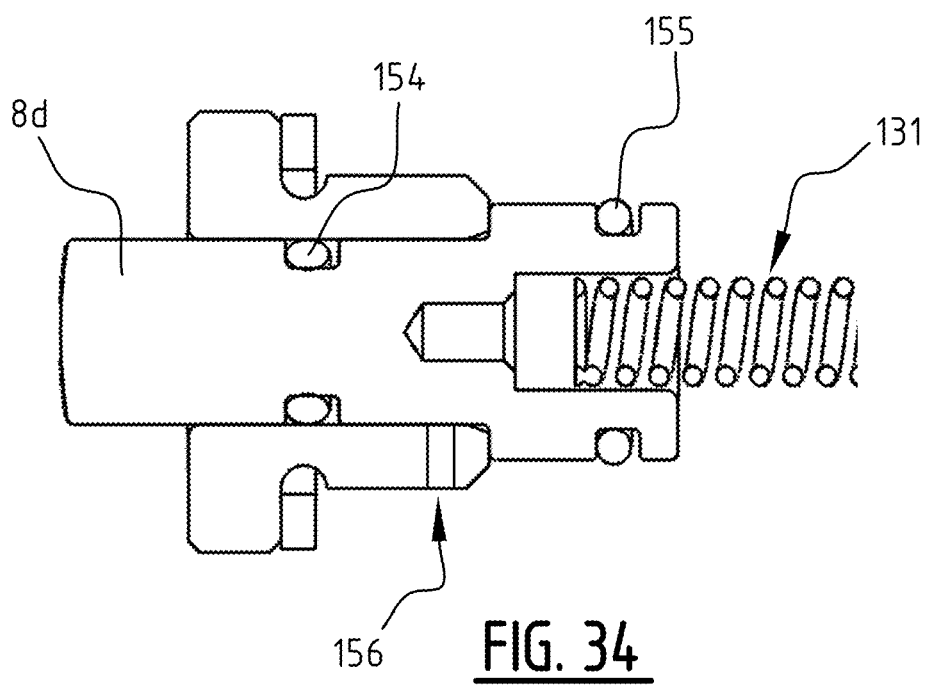
FIG. 34 is a cross-sectional view of a retracting pin of the coupling shown in FIGS. 23 and 24.

After the described functions have been performed, valve assembly 18d can be retrieved by the user. Control valve 119 must be reset in order to be used again. Control pins 127 of both valve 120 and valve 121 are pushed in simultaneously by means of screwing reset screw 157 in and out (FIG. 32). Provided that valve 16d is in the return position, all remaining residual pressure will disappear hereby. Locking pin 166 of control valve 119 must be pulled out manually in order to return control plunger 152 of control valve 119 to its first position. After this, all valves are in their original starting position.

Figure 35:
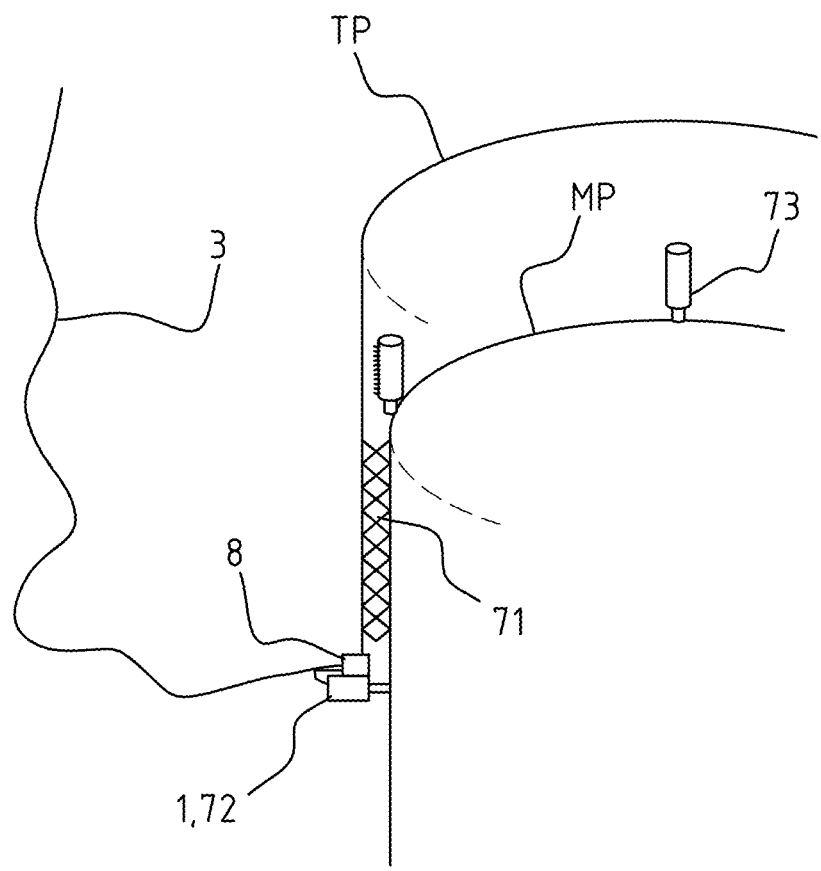
FIG. 35 is a schematic representation of a release arranged between a transition piece and a cylinder.

FIG. 35 shows a release between the transition piece (TP) and the cylinder, where supply conduit 3 runs to the coupling with release 8 therein, and then a further conduit from the coupling to the cylinder. When grout 71 has cured, wherein cylinders 1 which function as fixation cylinders 72 during curing engage the monopile (MP) from the TP in order to immobilize the TP relative to the MP in a dead straight position brought about with the adjusting cylinders 73 in order to compensate for any incline of the MP, the coupling can be controlled in order to release, after which fixation cylinders 1, 72 detach from the TP and are thus recoverable. Oil leakage can thus be prevented with certainty. The recoverable fixation cylinder 1, 72 should however ideally be made reliable enough to still function properly under water after a considerable time, for instance two weeks, and be usable for a subsequent project, which could increase costs. To this day, project managers in the offshore wind industry are assessed on the results of the project, in terms of speed and costs. This is why these project managers currently generally still seek out the cheapest solution for their project and, for the time being, are less focused on the long term.

Figure 36:
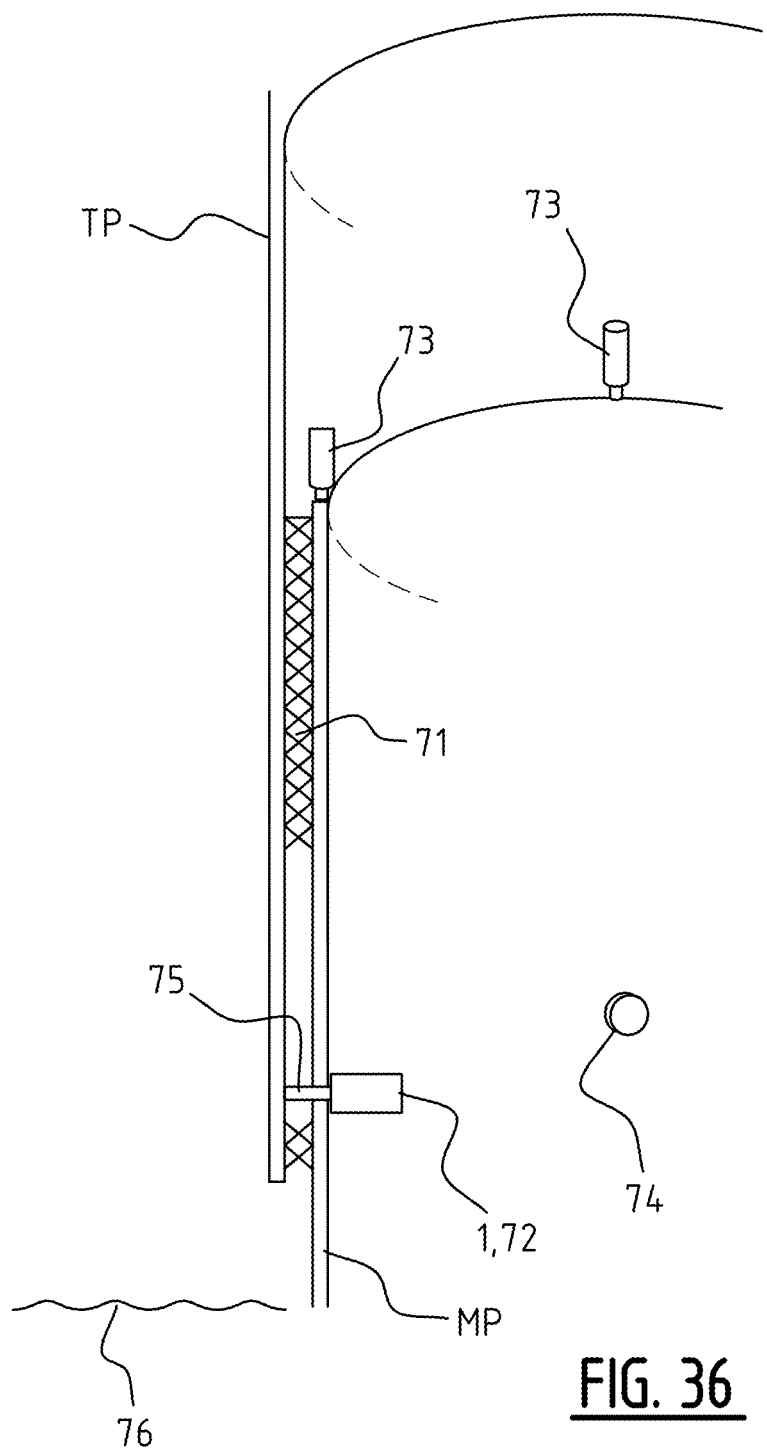
FIG. 36 is a schematic representation of a further preferred embodiment with recoverable fixation cylinders.

For the embodiment in FIG. 36 it is also the case that the cylinders 1 applied therein as fixation cylinders 72 are recoverable because they are arranged in the interior of an MP and TP assembly. This can be an additional/alternative development, separate from controlling of the operation of the release with pressure in a single supply conduit, as in the above described embodiments. Holes or passages 74 are here arranged in the wall of the MP and a piston rod 75 of a fixation cylinder 1, 72 is inserted through each hole or opening 74. If the fixation cylinders 1, 72 are actuated with pressurized hydraulic liquid, the TP is immobilized relative to the MP, which thus does not take place until the adjusting cylinders 73 have at least made a start with aligning the TP dead straight with the MP. Fixation cylinders 1, 72 can be attached to the MP with interposing of a support or trestle welded onto the MP, or can be welded directly onto the MP. After curing of grout 71 the fixation cylinders 1, 72 can be removed from the inside. Because fixation cylinders 1, 72 can here be arranged above the waterline 76, simplifications of fixation cylinders 1, 72 can even be envisaged relative to the fixation cylinders 1, 72 outside the TP and MP assembly, as in the above described embodiments, and it is expected that they can be reused more easily and at lower cost. Placing the fixation cylinders 1, 72 at the position of adjusting cylinders 73 can prevent holes from having to be arranged in the MP. The dead straight alignment may then however be more difficult to achieve, and holes in the MP can moreover be filled after curing of grout 71 and removal of fixation cylinders 1, 72 and spaces between the holes or openings 74 and the piston rods 75 protruding therein can be filled, so that during pouring or curing thereof, grout 71 cannot flow along piston rods 75 into the interior space of the assembled MP and TP.

The invention relates to a method for selectively coupling or uncoupling a coupling with a release 8, 8a, 8b, 8c, 8d, arranged between the supply conduit 3, 3a, 3b, 3c, 3d and a cylinder 1, 1a, 1b, 1c, 1d, on the basis of pressure in a supply conduit 3, 3a, 3b, 3c, 3d, comprising the steps of:

providing an operating pressure prevailing in the supply conduit 3, 3a, 3b, 3c, 3d in order to provide hydraulic liquid to the cylinder 1, 1a, 1b, 1c, 1d on the basis thereof; and providing an uncoupling pressure prevailing in the supply conduit 3, 3a, 3b, 3c, 3d for the purpose of:

activating shut-off valves 32, 33, 132, 133 in the supply conduit 3, 3a, 3b, 3c, 3d and on the cylinder 1, 1a, 1b, 1c, 1d; and activating a release 8, 8a, 8b, 8c, 8d which uncouples the coupling.

According to the preferred embodiment shown in FIGS. 3-34, the method further comprises the step, after the uncoupling of the coupling and the cylinder 1, 1a, 1b, 1c, 1d, of removing the supply conduit 3, 3a, 3b, 3c, 3d with the coupling connected thereto and, preferably, the step of leaving behind the cylinder 1, 1a, 1b, 1c, 1d on a foundation construction MP.

Figure 39:
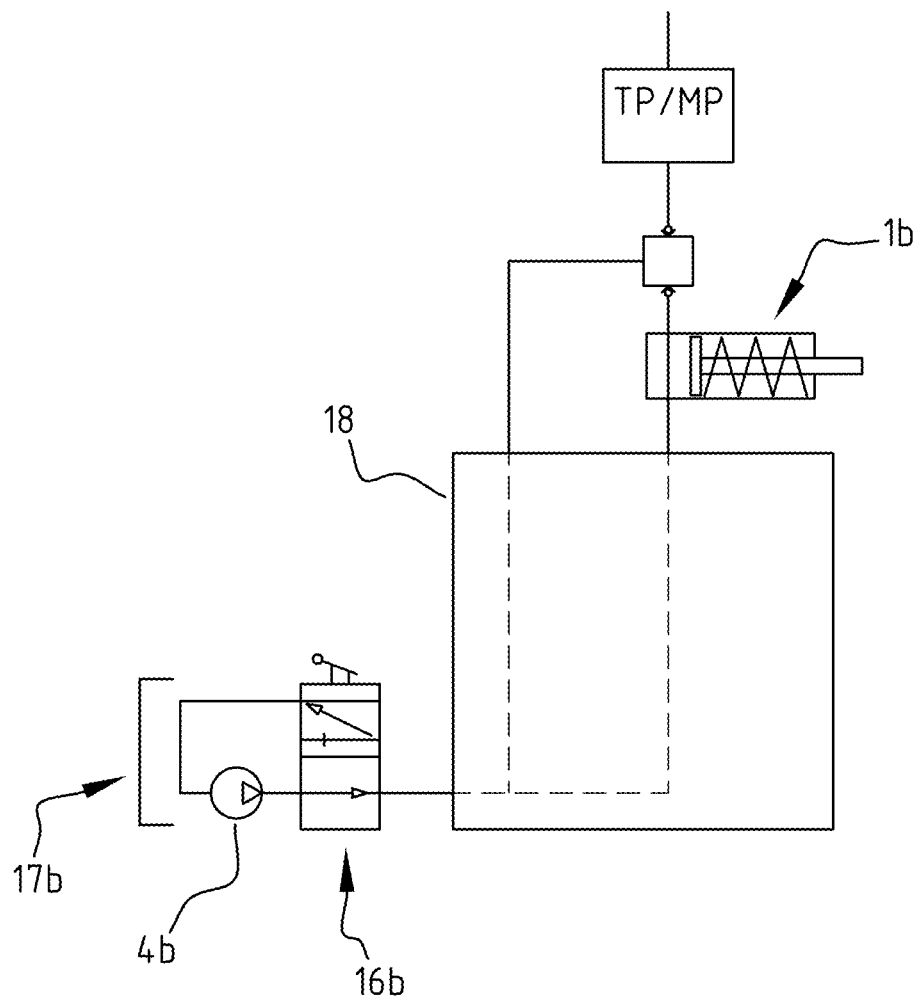
FIG. 39 is a schematic representation of a further preferred embodiment with recoverable fixation cylinders.

It is however possible to envisage that, as shown in FIGS. 36 and 39, the cylinder 1 is uncoupled from foundation construction MP, wherein the coupling and cylinder 1 are removable together with the supply conduit 3.

According to the preferred embodiment shown in FIGS. 3-34, the cylinder 1, 1a, 1b, 1c, 1d is left behind on the foundation construction MP. In order to prevent hydraulic liquid from being able to leak to the surrounding area as soon as the coupling uncouples the supply conduit 3, 3a, 3b, 3c, 3d from the cylinder 1, 1a, 1b, 1c, 1d the method preferably further comprises the step of evacuating the hydraulic liquid from the cylinder prior to the uncoupling of the coupling when an evacuation pressure prevails in the supply conduit 3, 3a, 3b, 3c, 3d.

According to a preferred embodiment of the method, it comprises the step of providing in the supply conduit 3, 3a, 3b, 3c, 3d the evacuation pressure with a pressure level lower than the pressure level of the operating pressure. In the cylinder 1, 1a, 1b, 1c, 1d a compression spring 13b can be provided which presses a cylinder chamber 15b empty, whereby an evacuation of the hydraulic liquid from the cylinder 1, 1a, 1b, 1c, 1d can take place.

According to a further preferred embodiment, the method comprises of providing an evacuation position setting pressure prior to setting the evacuation pressure. At this evacuation position setting pressure the coupling can be set for a subsequent evacuation of the hydraulic liquid from the cylinder 1, 1a, 1b, 1c, 1d.

Figure 37:
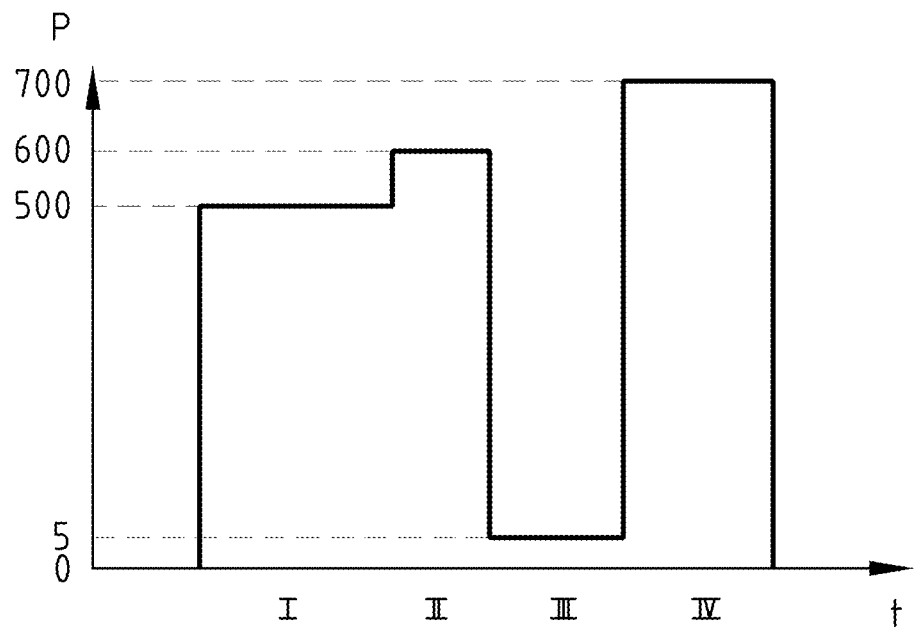
FIG. 37 is a schematic representation of a typical pressure variation in application of a coupling according to the second and third preferred embodiment.

According to yet another preferred embodiment, providing the evacuation position setting pressure comprises of raising the pressure prevailing in the supply conduit 3, 3a, 3b, 3c, 3d from the level of the operating pressure to a pressure higher than the pressure level of the evacuation position setting pressure. The evacuation position setting pressure of the embodiment shown in FIGS. 6-18 is shown as a pressure level at 600 bar in FIG. 37.

According to yet another preferred embodiment, providing the uncoupling pressure prevailing in the supply conduit 3, 3a, 3b, 3c, 3d comprises of providing an uncoupling pressure with a pressure higher than the pressure level of the evacuation pressure. The uncoupling pressure of the embodiment shown in FIGS. 6-18 is shown as a pressure level at 700 bar in FIG. 37.

Figure 38:
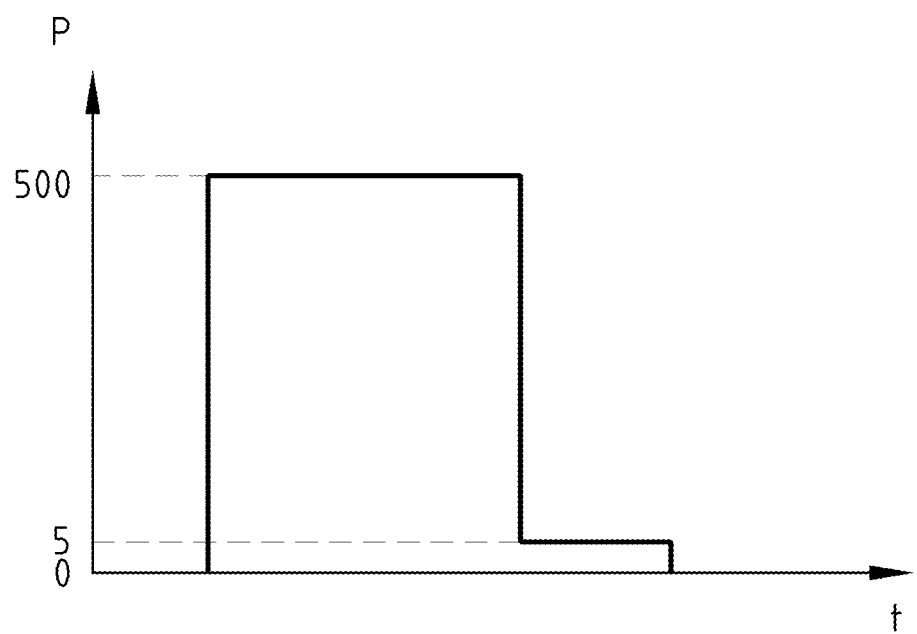
FIG. 38 is a schematic representation of a typical pressure variation in application of a coupling according to the first preferred embodiment.

According to yet another preferred embodiment, providing the uncoupling pressure prevailing in the supply conduit 3, 3a, 3b, 3c, 3d comprises of providing an uncoupling pressure with a pressure higher than the pressure level of the operating pressure. The operating pressure of the embodiment shown in FIGS. 6-18 is shown as a pressure level at 500 bar in FIG. 37. According to yet another preferred embodiment, providing the uncoupling pressure prevailing in the supply conduit 3, 3a, 3b, 3c, 3d comprises of providing an uncoupling pressure with a pressure higher than the pressure level of the evacuation position setting pressure. FIG. 38 shows the evacuation setting pressure at 600 bar and the uncoupling pressure at 700 bar.

According to yet another preferred embodiment, when an evacuation pressure prevails in the supply conduit 3, 3a, 3b, 3c, at least one control valve 19, 34, 119 functions selectively as a non-return valve which admits flow of hydraulic liquid away from the cylinder 1, 1a, 1b, 1c and blocks flow of hydraulic liquid to the cylinder 1, 1a, 1b, 1c. In the second embodiment, shown in FIGS. 7-18, a first control valve 19 and a second control valve 34 are provided, while the fourth embodiment shown in FIGS. 23-34 provides the same functionality with one control valve 119. According to an alternative preferred embodiment, providing the evacuation pressure comprises of reducing the pressure prevailing in the supply conduit 3, 3a from the level of the operating pressure to a lower pressure level of the evacuation pressure. Of the embodiment shown in FIGS. 3-5, the evacuation pressure is shown in FIG. 38 as a pressure level at 5 bar, which is lower than the operating pressure of 500 bar.

According to a further alternative preferred embodiment, providing the uncoupling pressure prevailing in the supply conduit 3, 3a comprises of providing an uncoupling pressure with a pressure lower than the pressure level of the evacuation pressure. The uncoupling pressure of the embodiment shown in FIGS. 3-5 is shown as a pressure lower than 5 bar in FIG. 38.

The shown preferred embodiments show a coupling for respectively coupling and uncoupling a supply conduit 3, 3a, 3b, 3c, 3d which is connected to the coupling to/from a cylinder 1, 1a, 1b, 1c, 1d, comprising:

a hydraulically controllable release; and a hydraulic control which is connected at least to the release and is configured to:

provide hydraulic liquid to the cylinder 1, 1a, 1b, 1c, 1d when an operating pressure prevails in the supply conduit 3, 3a, 3b, 3c, 3d; and activate the release and uncoupling the coupling when an uncoupling pressure prevails in the supply conduit 3, 3a, 3b, 3c, 3d.

According to a preferred embodiment of the coupling, this coupling is configured to remain connected to the supply conduit 3, 3a, 3b, 3c after uncoupling from the cylinder 1, 1a, 1b, 1c, 1d.

According to a further preferred embodiment of the coupling, the hydraulic control is configured to evacuate the hydraulic liquid from the cylinder 1, 1a, 1b, 1c, 1d when an evacuation pressure prevails in the supply conduit 3, 3a, 3b, 3c, 3d.

According to yet another preferred embodiment of the coupling, it further comprises shut-off valves 32, 33 on the cylinder 1, 1a, 1b, 1c and on the supply conduit 3, 3a, 3b, 3c, wherein shut-off valves 32, 33 can be activated by activating the release.

According to yet another preferred embodiment of the coupling, it further comprises at least one control valve 19, 34, 119 which is configured to admit at least flow of hydraulic liquid to the cylinder 1, 1*a*, 1*b*, 1*c* when an operating pressure prevails in the supply conduit 3, 3*a*, 3*b*, 3*c*. In practice, each of the at least one control valve 19, 34, 119 is configured to admit at least flow of hydraulic liquid to the cylinder 1, 1*a*, 1*b*, 1*c*, 1*d* when an operating pressure prevails in the supply conduit 3, 3*a*, 3*b*, 3*c*.

According to yet another preferred embodiment of the coupling, the at least one control valve 19, 34, 119 is configured to block flow of hydraulic liquid away from the cylinder 1, 1*a*, 1*b*, 1*c*, 1*d* when an operating pressure prevails in the supply conduit 3, 3*a*, 3*b*, 3*c*. In a preferred embodiment with a first control valve 19 and a second control valve 34 both control valves 19, 34 are preferably configured to block flow of hydraulic liquid away from the cylinder 1, 1*a*, 1*b*, 1*c*, 1*d* when an operating pressure prevails in the supply conduit 3, 3*a*, 3*b*, 3*c*.

According to yet another preferred embodiment of the coupling, one of the at least one control valve 19, 34, 119 is configured to function as non-return valve which blocks flow of hydraulic liquid away from the cylinder 1, 1*a*, 1*b*, 1*c*, 1*d* when an operating pressure prevails in the supply conduit 3, 3*a*, 3*b*, 3*c*. In the shown second embodiment with two control valves 19, 34 the second control valve 34 fulfils this function.

According to yet another preferred embodiment of the coupling, each of the at least one control valve 19, 34, 119 is configured to admit flow of hydraulic liquid away from the cylinder 1, 1*a*, 1*b*, 1*c*, 1*d* after an evacuation position setting pressure has been reached and when an evacuation pressure prevails in the supply conduit 3, 3*a*, 3*b*, 3*c*, 3*d*.

According to yet another preferred embodiment of the coupling, at least one of the at least one control valve 19, 34, 119 is configured to selectively function as a non-return valve configured to admit flow of hydraulic liquid away from the cylinder 1, 1*a*, 1*b*, 1*c*, 1*d* and to block flow of hydraulic liquid to the cylinder 1, 1*a*, 1*b*, 1*c*, 1*d* when the evacuation pressure prevails in the supply conduit 3, 3*a*, 3*b*, 3*c*, 3*d*. In the shown second embodiment with two control valves 19, 34 the second control valve 34 fulfils this function.

According to yet another preferred embodiment of the coupling, at least one of the at least one control valve 19, 34, 119 is configured to selectively function as a non-return valve configured to block flow of hydraulic liquid to the cylinder 1, 1*a*, 1*b*, 1*c* when an uncoupling pressure prevails in the supply conduit 3, 3*a*, 3*b*, 3*c*. In the shown second embodiment with two control valves 19, 34 the second control valve 34 fulfils this function.

According to yet another preferred embodiment of the coupling, it comprises a sequence valve 20 configured to admit flow to the at least one control valve 19, 34, 119 when the evacuation position setting pressure or the uncoupling pressure prevails in the supply conduit 3, 3*a*, 3*b*, 3*c*, 3*d*, wherein this at least one control valve 19, 34, 119 is configured, on the basis of this admitted flow, to be:

released from a setting as non-return valve which is configured to admit flow of hydraulic liquid to the cylinder 1, 1*a*, 1*b*, 1*c*, 1*d* and to block flow of hydraulic liquid away from the cylinder 1, 1*a*, 1*b*, 1*c*, 1*d*; and set as a non-return valve which is configured to admit flow of hydraulic liquid away from the cylinder 1, 1*a*, 1*b*, 1*c*, 1*d* and to block flow of hydraulic liquid to the cylinder 1, 1*a*, 1*b*, 1*c*, 1*d*.

According to yet another preferred embodiment of the coupling, the at least one control valve 19, 34, 119 comprises the first control valve 19 and the second control valve 34, wherein:

first control valve 19 is configured to be released from a setting as non-return valve on the basis of this admitted flow; and second control valve 34 is configured to be set on the basis of this admitted flow as a non-return valve which is configured to admit flow of hydraulic liquid away from the cylinder 1, 1*a*, 1*b*, 1*c* and to block flow of hydraulic liquid to the cylinder 1, 1*a*, 1*b*, 1*c*.

According to yet another preferred embodiment of the coupling, it comprises a further sequence valve 21 configured to admit flow to the release when an uncoupling pressure prevails in the supply conduit 3, 3*a*, 3*b*, 3*c*, 3*d*, wherein the release is configured to release and to uncouple the coupling on the basis of this admitted flow.

According to yet another preferred embodiment, the coupling further comprises a mechanical locking which is configured to lock control valve 119 in a position corresponding to the evacuation position setting pressure. A mechanical locking is more reliable and can be controlled better than a hydraulic locking.

FIGS. 3, 6, 8, 13-17, 19, 20, 23, 28-31 and 39 in particular show an assembly, comprising: a pump 4, 4*a*, 4*b*, 4*c*, 4*d*, a cylinder 1, 1*a*, 1*b*, 1*c*, 1*d*, a supply conduit 3, 3*a*, 3*b*, 3*c*, 3*d* between the pump and the cylinder; and a coupling according to the invention.

In a preferred embodiment this assembly further comprises a control (not shown) which controls the pump 4, 4*a*, 4*b*, 4*c*, 4*d* and is configured to control the pump 4, 4*a*, 4*b*, 4*c*, 4*d* in order to selectively generate a pressure in the supply conduit 3, 3*a*, 3*b*, 3*c*, 3*d* from a group comprising at least: operating pressure or uncoupling pressure.

In a further preferred embodiment the control (not shown) which controls the pump is further configured to control the pump 4, 4*a*, 4*b*, 4*c*, 4*d* in order to selectively generate an evacuation pressure in the supply conduit 3, 3*a*, 3*b*, 3*c*, 3*d*. The invention also relates to such a control.

Although they show preferred embodiments of the invention, the above described embodiments are intended only to illustrate the present invention and not to limit the scope of the invention in any way. It is thus noted that a connection between a foundation construction, more particularly a monopile MP, and a transition part, more particularly a transition piece TP, is described as possible application of the invention, but that the invention is not limited thereto. The invention is particularly suitable for locations that are difficult to access, such as typically below a water surface. Other applications are for instance under the ground, such as in mining.

When measures in the claims are followed by reference numerals, such reference numerals serve only to contribute toward understanding of the claims, but are in no way limitative of the scope of protection. It is particularly noted that the skilled person can combine technical measures of the different embodiments.

The rights described are defined by the following claims, within the scope of which many modifications can be envisaged.

The invention claimed is:

1. A method for selectively coupling or uncoupling a coupling with a release, arranged between the supply conduit and a cylinder, on the basis of pressure in a supply conduit, comprising the steps of:

providing an operating pressure prevailing in the supply conduit in order to provide hydraulic liquid to the cylinder on the basis thereof; and providing an uncoupling pressure prevailing in the supply conduit for the purpose of:

activating shut-off valves in the supply conduit and on the cylinder; and
activating a release which uncouples the coupling.

2. The method according to claim 1, further comprising one or more than one of:
the step, after the uncoupling of the coupling and the cylinder, of removing the supply conduit with the coupling connected thereto; and
the step of leaving behind the cylinder on a foundation construction.

3. The method according to claim 1, comprising:
the step of evacuating the hydraulic liquid from the cylinder prior to the uncoupling of the coupling when an evacuation pressure prevails in the supply conduit; and
the step of providing in the supply conduit the evacuation pressure with a pressure level lower than the pressure level of the operating pressure.

4. The method according to claim 3, comprising:
the step of providing an evacuation position setting pressure prior to setting the evacuation pressure;
wherein at least one of:
providing the evacuation position setting pressure comprises of raising the pressure prevailing in the supply conduit from the level of the operating pressure to a pressure higher than the pressure level of the evacuation position setting pressure; and
providing the uncoupling pressure prevailing in the supply conduit comprises of providing an uncoupling pressure with a pressure higher than the pressure level of the evacuation pressure.

5. The method according to claim 1, wherein providing the uncoupling pressure prevailing in the supply conduit comprises providing an uncoupling pressure with a pressure higher than the pressure level of the operating pressure.

6. The method according to claim 4, wherein:
providing the uncoupling pressure prevailing in the supply conduit comprises of providing an uncoupling pressure with a pressure higher than the pressure level of the evacuation position setting pressure; and
at least one control valve functions selectively as a non-return valve which admits flow of hydraulic liquid away from the cylinder and blocks flow of hydraulic liquid to the cylinder when an evacuation pressure prevails in the supply conduit.

7. The method according to claim 3, wherein providing the evacuation pressure comprises of reducing the pressure prevailing in the supply conduit from the level of the operating pressure to a lower pressure level of the evacuation pressure.

8. The method according to claim 3, wherein providing the uncoupling pressure prevailing in the supply conduit comprises of providing an uncoupling pressure with a pressure lower than the pressure level of the evacuation pressure.

9. A coupling for respectively coupling and uncoupling a supply conduit which is connected to the coupling to/from a cylinder, comprising:
a hydraulically controllable release; and
a hydraulic control which is connected at least to the release and is configured to:
provide hydraulic liquid to the cylinder when an operating pressure prevails in the supply conduit; and
activate the release and uncoupling the coupling when an uncoupling pressure prevails in the supply conduit.

10. The coupling according to claim 9, wherein at least one of:
the coupling is configured to remain connected to the supply conduit after uncoupling from the cylinder;
the hydraulic control is configured to evacuate the hydraulic liquid from the cylinder when an evacuation pressure prevails in the supply conduit; and
further comprising shut-off valves on the cylinder and on the supply conduit, wherein the shut-off valves can be activated by activating the release.

11. The coupling according to claim 9, further comprising at least one control valve which is configured to admit at least flow of hydraulic liquid to the cylinder when an operating pressure prevails in the supply conduit;
wherein the at least one control valve is configured to block flow of hydraulic liquid away from the cylinder when an operating pressure prevails in the supply conduit; and
wherein one of the at least one control valve is configured to function as non-return valve which blocks flow of hydraulic liquid away from the cylinder when an operating pressure prevails in the supply conduit.

12. The coupling according to claim 11, wherein each of the at least one control valve is further configured to admit flow of hydraulic liquid away from the cylinder after an evacuation position setting pressure has been reached and when an evacuation pressure prevails in the supply conduit; and
wherein at least one of the at least one control valve is configured to selectively function as a non-return valve configured to at least one of:
admit flow of hydraulic liquid away from the cylinder and to block flow of hydraulic liquid to the cylinder when the evacuation pressure prevails in the supply conduit; and
block flow of hydraulic liquid to the cylinder when an uncoupling pressure prevails in the supply conduit.

13. The coupling according to claim 12, further comprising a sequence valve configured to admit flow to the at least one control valve when the evacuation position setting pressure or the uncoupling pressure prevails in the supply conduit, wherein this at least one control valve is configured, on the basis of this admitted flow, to be:
released from a setting as non-return valve which is configured to admit flow of hydraulic liquid to the cylinder and to block flow of hydraulic liquid away from the cylinder; and
set as a non-return valve which is configured to admit flow of hydraulic liquid away from the cylinder and to block flow of hydraulic liquid to the cylinder;
wherein at least one of:
at least one control valve comprises a first control valve and a second control valve, wherein:
the first control valve is configured to be released from a setting as non-return valve on the basis of this admitted flow; and
the second control valve is configured to be set on the basis of this admitted flow as a non-return valve which is configured to admit flow of hydraulic liquid away from the cylinder and to block flow of hydraulic liquid to the cylinder;
further comprising a further sequence valve configured to admit flow to the release when an uncoupling pressure prevails in the supply conduit, wherein the release is configured to release and to uncouple the coupling on the basis of this admitted flow; and
further comprising a mechanical locking which is configured to lock the control valve in a position corresponding to the evacuation position setting pressure.

14. An assembly, comprising:
a pump,
a cylinder,
a supply conduit between the pump and the cylinder; and
the coupling according to claim 9;
the assembly further comprising a control which controls the pump and is configured to control the pump in order to selectively generate a pressure in the supply conduit from a group comprising: operating pressure or uncoupling pressure;
wherein the control which controls the pump is configured to control the pump in order to selectively generate an evacuation pressure in the supply conduit.

15. A control for or of the assembly according to claim 14.

* * * * *